(12) United States Patent
Izumiya

(10) Patent No.: US 8,220,013 B2
(45) Date of Patent: Jul. 10, 2012

(54) RECORDING MEDIUM DRIVE APPARATUS AND ELECTRONIC APPARATUS

(75) Inventor: Yusuke Izumiya, Kanagawa (JP)

(73) Assignee: Sony NEC Optiarc Inc., Tokyo (JP)

( * ) Notice: Subject to any disclaimer, the term of this patent is extended or adjusted under 35 U.S.C. 154(b) by 950 days.

(21) Appl. No.: 12/244,895

(22) Filed: Oct. 3, 2008

(65) Prior Publication Data

US 2009/0125925 A1    May 14, 2009

(30) Foreign Application Priority Data

Nov. 8, 2007 (JP) ................................. 2007-290697

(51) Int. Cl.
*G11B 7/0037* (2006.01)
*G11B 17/028* (2006.01)
*G11B 19/20* (2006.01)

(52) U.S. Cl. ..................... 720/713; 720/690; 720/697

(58) Field of Classification Search .................. 720/690, 720/697, 713, 706, 703, 695, 633, 663, 689, 720/696
See application file for complete search history.

(56) References Cited

U.S. PATENT DOCUMENTS

| 7,676,819 B2 * | 3/2010 | Tsutsumi et al. ............. 720/623 |
| 7,739,704 B2 * | 6/2010 | Wada et al. .................... 720/695 |
| 2007/0297297 A1 * | 12/2007 | Wada ......................... 369/44.15 |
| 2009/0031333 A1 * | 1/2009 | Wada ............................. 720/620 |
| 2009/0178064 A1 * | 7/2009 | Wada ............................. 720/601 |

FOREIGN PATENT DOCUMENTS

JP       2004-310921       11/2004

* cited by examiner

*Primary Examiner* — Julie Anne Watko
(74) *Attorney, Agent, or Firm* — Oblon, Spivak, McClelland, Maier & Neustadt, L.L.P.

(57) ABSTRACT

Disclosed is a recording medium drive apparatus configured to drive a recording medium, including a case, a drive source used for loading/ejecting the recording medium into/from the case, a motor unit configured to hold the recording medium and rotate the recording medium held, a pickup unit configured to record a signal on the recording medium rotated by the motor unit or reproduce the recorded signal, a first slider driven by the drive source to slide a first distance in a first direction, a second slider that is cam-engaged with the pickup unit and slides in a second direction to move the pickup unit upward and downward, a moving member that is releasably engaged with the first slider, engaged with the pickup unit, and cam-engaged with the motor unit, and moves the motor unit upward and downward, and a link mechanism configured to link the first slider and the second slider.

6 Claims, 32 Drawing Sheets

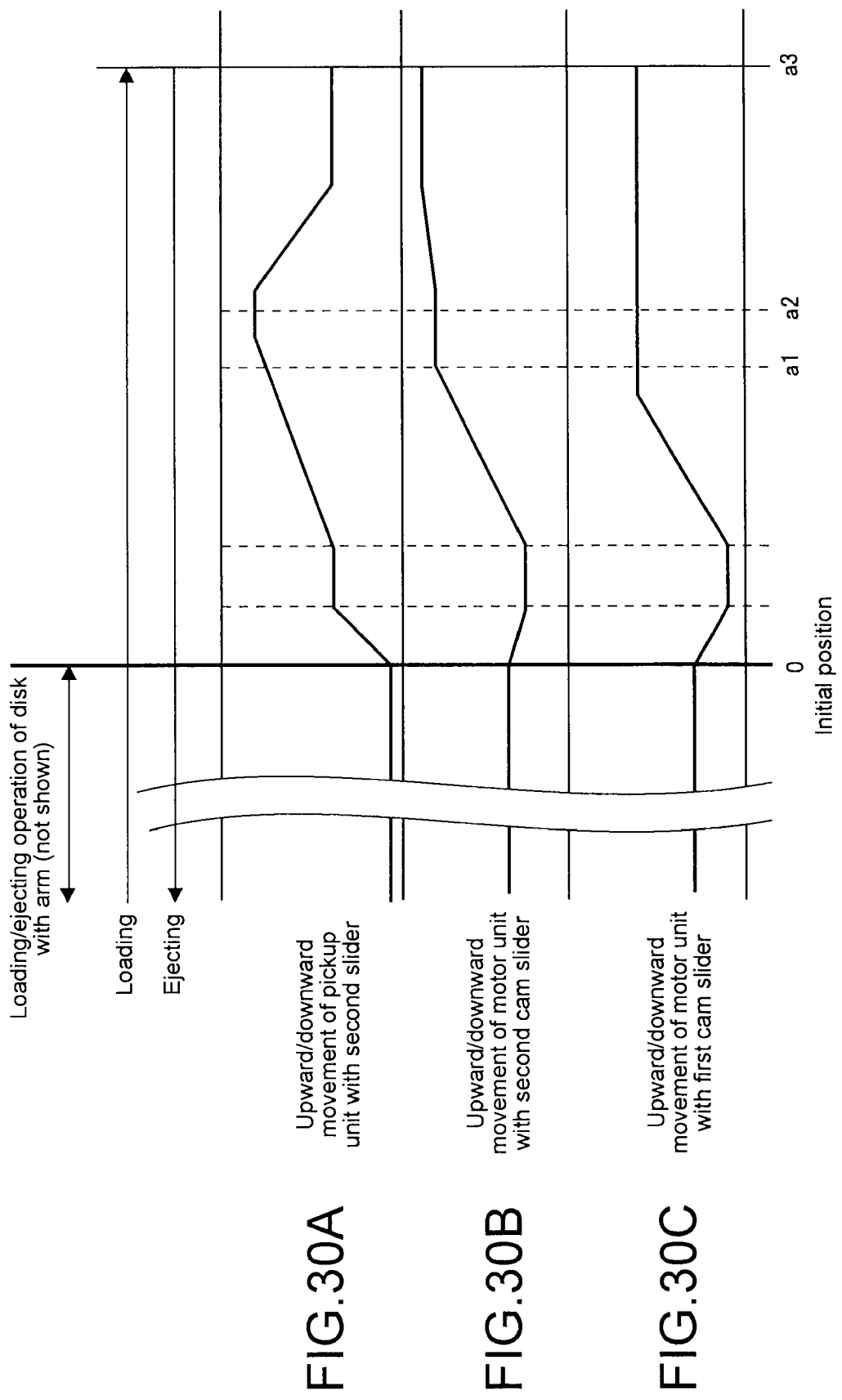

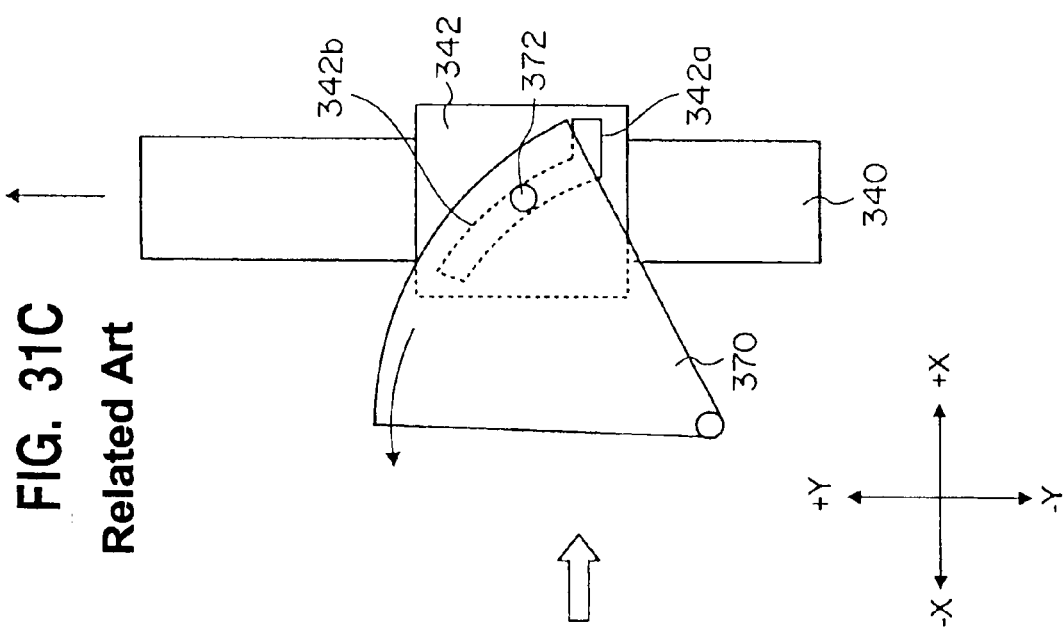
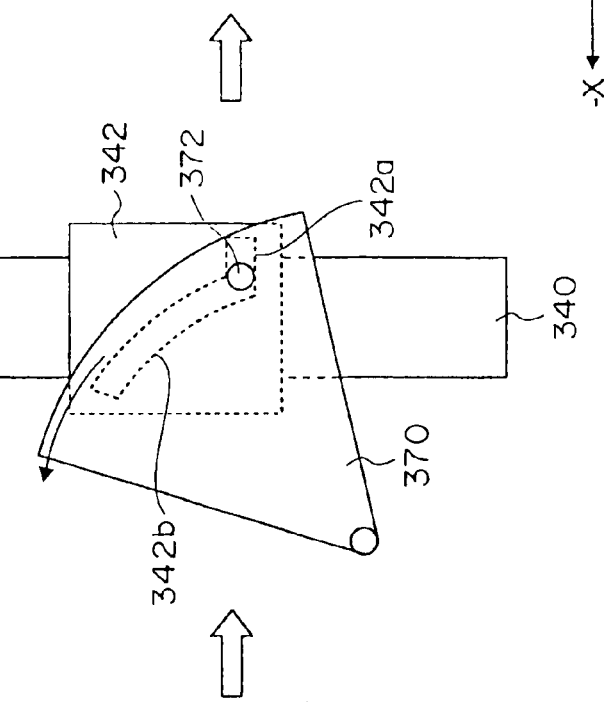
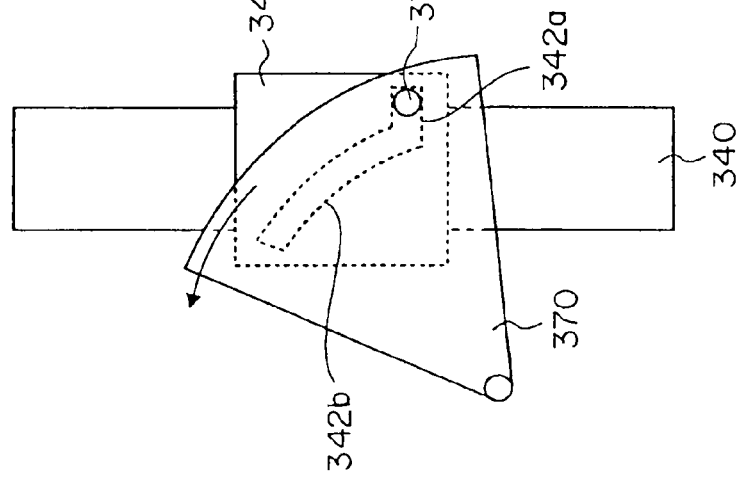
FIG. 31A Related Art
FIG. 31B Related Art
FIG. 31C Related Art

RECORDING MEDIUM DRIVE APPARATUS AND ELECTRONIC APPARATUS

CROSS REFERENCES TO RELATED APPLICATIONS

The present invention contains subject matter related to Japanese Patent Application JP 2007-290697 filed in the Japanese Patent Office on Nov. 8, 2007, the entire contents of which being incorporated herein by reference.

BACKGROUND OF THE INVENTION

1. Field of the Invention

The present invention relates to a recording medium drive apparatus that performs recording and/or reproducing information with respect to a recording medium, and an electronic apparatus including the recording medium drive apparatus mounted thereon.

2. Description of the Related Art

As an optical disk drive apparatus, a tray-type disk apparatus including a tray on which a disk is mounted, or a slot-in-type disk apparatus with no such a tray is proposed. Examples of the slot-in-type disk apparatus include the followings (see, Japanese Patent Application Laid-open No. 2004-310921, paragraph [0013], FIG. 3 (hereinafter, referred to as Patent Document 1)).

In a disk apparatus (1) disclosed in Patent Document 1, an optical pickup (reproducing/recording apparatus (5)) on which a spindle motor (8) is mounted is caused to move upward and downward by a lifting/lowering mechanism provided in the disk apparatus (1). With this structure, a disk is chucked on a turntable (10) provided on the spindle motor (8). In this case, when the disk is inserted into or ejected from the disk apparatus (1), the turntable (10) is located in a lower position by the lifting/lowering mechanism so as not to interfere with an insertion/ejection movement of the disk.

Specifically, in Patent Document 1, the lifting/lowering mechanism has the following mechanism. A cam groove (20) is formed on a side surface of a slide member (19) moved by a motor (18) serving as a drive source when the disk is inserted or ejected. A cam follower (not shown) formed on a side surface of the reproducing/recording apparatus (5) is engaged with the cam groove (20). Thus, the slide member (19) is moved forward and backward, to thereby move the reproducing/recording apparatus (5) upward and downward.

SUMMARY OF THE INVENTION

In the disk drive apparatus described in Patent Document 1, however, the cam groove (20) is formed so that a height thereof falls within a range corresponding to an upward/downward movement amount of the turntable (10). Accordingly, a height (thickness in a vertical direction) of the slide member (19) is required to be set to a height corresponding to the upward/downward movement amount of the turntable (10). That is, depending on the upward/downward movement amount of the turntable (10), the height of the slide member (19) may be increased, which increases a thickness of the disk drive apparatus (1), with the result that the disk drive apparatus (1) is hindered from being thinned.

In contrast, when the height of the slide member (19) is reduced in order to thin the disk drive apparatus (1), an upward/downward movement distance of the turntable (10) is reduced, with the result that the above-mentioned interference may occur.

In view of the above-mentioned circumstances, it is desirable to provide a recording medium drive apparatus capable of securing a sufficient upward/downward movement distance of a motor unit while realizing reduction in thickness of the recording medium drive apparatus, and an electronic apparatus including the recording medium drive apparatus mounted thereon.

It is also desirable to provide a technique of facilitating designing of upward/downward movement mechanisms of a pickup unit and a motor unit in manufacturing the recording medium drive apparatus, in addition to providing the recording medium drive apparatus and the electronic apparatus described above.

According to an embodiment of the present invention, there is provided a recording medium drive apparatus configured to drive a recording medium. The recording medium drive apparatus includes a case, a drive source, a motor unit, a pickup unit, a first slider, a second slider, a moving member, and a link mechanism. The drive source is used for loading the recording medium into the case and ejecting the recording medium from the case. The motor unit is configured to hold the recording medium and rotate the recording medium held. The pickup unit is configured to perform one of recording a signal on the recording medium that is rotated by the motor unit and reproducing the signal recorded on the recording medium. The first slider is driven by the drive source to slide a first distance in a first direction. The second slider is cam-engaged with the pickup unit and slides in a second direction to move the pickup unit upward and downward. The moving member is releasably engaged with the first slider, engaged with the pickup unit, and cam-engaged with the motor unit, and slides a second distance in the first direction integrally with the first slider while being engaged with the first slider, to move the motor unit upward and downward, the second distance being shorter than the first distance. The link mechanism is configured to link the first slider and the second slider so that a moving speed of the first slider in the first direction corresponds to a moving speed of the second slider in the second direction and the second slider slides the first distance.

In the embodiment of the present invention, the pickup unit supports the motor unit through the moving member. Therefore, when the pickup unit moves upward and downward with the second slider, in conjunction with this movement, the motor unit moves upward and downward. Further, with the moving member, the motor unit moves upward and downward relatively to the pickup unit. That is, when the pickup unit moves downward, the motor unit also moves downward with respect to the pickup unit. Thus, even when the upward/downward movement distance is designed to be short, a clearance for loading the recording medium into the case can be ensured and interference between the recording medium and the motor unit can be prevented.

Further, in the embodiment of the present invention, the moving speed of the second slider linking to the first slider is the same as that of the first slider. That is, the first slider and the second slider move in the same way (at a ratio of 1:1), which facilitates designing of timings of the upward/downward movement of the motor unit that moves integrally with the first slider halfway and the upward/downward movement of the pickup unit with the second slider.

Further, even when the motor unit stops moving upward with respect to the pickup unit, the upward movement of the pickup unit itself causes the motor unit to move upward because of the difference between the first and the second distances. Therefore, in a case where the recording medium is chucked by, for example, clamping the recording medium with the motor unit and a ceiling surface of the case, the clamping force can be reliably generated.

The cam engagement means that two members are engaged with each other by a cam mechanism. In a case of simply referring to "engagement", the engagement has various meanings such as a cam engagement, an engagement by pressure, and an engagement due to a concave portion, a convex portion, or other shape.

The first direction and the second direction may be identical or different.

In addition to the moving member, for example, a member for moving the motor unit upward and downward by sliding integrally with the second slider may be provided.

The moving member includes an assist slider and a cam slider. The assist slider is configured to slide in the first direction by being pressed by the first slider. The cam slider is cam-engaged with the motor unit and configured to slide in the first direction integrally with the assist slider by being pressed by the assist slider.

The assist slider includes a roller that is pressed by the first slider when the pickup unit is moved upward, and cam-engaged with the case so that the roller is released from pressure by the first slider after the assist slider slides the second distance. For example, the assist slider is cam-engaged with the case so that the roller deviates upward or downward from the first slider. With this structure, at the time of manufacturing the recording medium drive apparatus, a main member of the assist slider is formed into a plate shape, and the plate member can be disposed in the case with a main surface of the plate member being laid substantially along the upward/downward movement direction (of the motor unit and the like). As a result, a footprint of the assist slider in the case can be made small.

Alternatively, the assist slider may be cam-engaged with the case so that the roller deviates rightward or leftward from the first slider. With this structure, at the time of manufacturing the recording medium drive apparatus, the main member of the assist slider is formed into a plate shape, and the plate member can be disposed in the case with the main surface of the plate member being laid in a substantially perpendicular direction to the upward/downward movement direction (of the motor unit and the like). As a result, the thickness of the recording medium drive apparatus can be reduced.

"To be cam-engaged with the case" also has a meaning of being cam-engaged with a member fixed (unmovable) to the case.

The moving member is cam-engaged with the motor unit so that the motor unit is moved downward against an upward movement of the pickup unit between when the moving member starts to slide and when the moving member reach the second distance. With this structure, a relative vertical interval between the pickup unit and the motor unit can be increased at a maximum extent. As a result, for example, at the time of ejecting the recording medium, the recording medium can be easily detached from the motor unit that holds the recording medium. For example, in the recording medium drive apparatus according to the embodiment of the present invention, the disk table above a motor of the motor unit moves downward from an upper surface of the pickup unit and an lower surface of the recording medium is pressed against the upper surface of the pickup unit, to thereby release the recording medium from being held by the motor unit. In this case, when the relative vertical interval between the pickup unit and the motor unit is large as described above, a force requisite for releasing the recording medium from being held can be increased. Thus, the recording medium can be positively detached from the motor unit.

Further, between when the moving member starts to slide and when the moving member reaches the second distance, that is, during a time period when the pickup unit is located at a higher position than the initial position (standby position), the motor unit moves downward against the pickup unit. Therefore, the motor unit is prevented from protruding downward of the lower surface of the case, and it can be ensured that the recording medium drive apparatus is reduced in thickness.

The second slider is cam-engaged with the pickup unit so that a state where the pickup unit is located at an uppermost position is maintained for a predetermined time period. For example, at the time of loading the recording medium (immediately after loading the recording medium), when the pickup unit is located at the uppermost position, the upper surface of the recording medium is in contact with the ceiling surface of the case, and a clamping force for chucking the recording medium occurs. By maintaining a state where the pickup unit is located at the uppermost position for a predetermined time period, chucking can be reliably performed. The predetermined time period typically refers to a time period during which the second slider slides 0.5 to 2 mm, but is not limited to this and can be suitably changed.

According to another embodiment of the present invention, there is provided an electronic apparatus capable of driving a recording medium. The electronic apparatus includes a recording medium drive apparatus and a main body on which the recording medium drive apparatus is mounted. The recoding medium driving apparatus described above can be adapted.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 7A and 7B are views each showing the second slider, in which FIG. 7A is a front view thereof and FIG. 7B is a perspective view thereof;

FIG. 9 is a plan view showing the first slider, the second slider, the motor unit, and the like;

FIGS. 30A to 30C are cam charts, in which FIG. 30A is a cam chart in relation to a cam groove of a second slider, FIG. 30B is a cam chart in relation to a cam groove of a second cam slider, and FIG. 30C is a cam chart in relation to a cam groove of a first slider;

FIGS. 31A-31C are a plan view illustrating movement of a slider and the like according to another patent document.

DESCRIPTION OF PREFERRED EMBODIMENTS

Hereinafter, an embodiment of a disk drive apparatus (recording medium drive apparatus) and an electronic apparatus according to the present invention will be described with reference to the drawings. In the embodiment described below, an electronic apparatus according to the present invention is applied to a personal computer, and a disk drive apparatus according to the present invention is applied to a disk drive apparatus provided to this personal computer.

It should be noted that applications of the electronic apparatus and the disk drive apparatus are not limited to the personal computer and the disk drive apparatus provided thereto, respectively. The electronic apparatus can be widely applied to various kinds of electronic apparatuses using a disk-shaped recording medium, specifically, an information terminal apparatus such as a game machine and a PDA (personal digital assistant), an image pickup apparatus such as a still camera, an electronic camera, and a video camera, or an recording apparatus or acoustic equipment using various kinds of disk-shaped recording media. The disk drive apparatus can be applied to a disk drive apparatus for recording and/or reproducing an information signal with respect to the disk-shaped recording medium used in those various kinds of electronic apparatuses. Hereinafter, the disk-shaped recording medium will be simply referred to as a disk.

Figure 1:
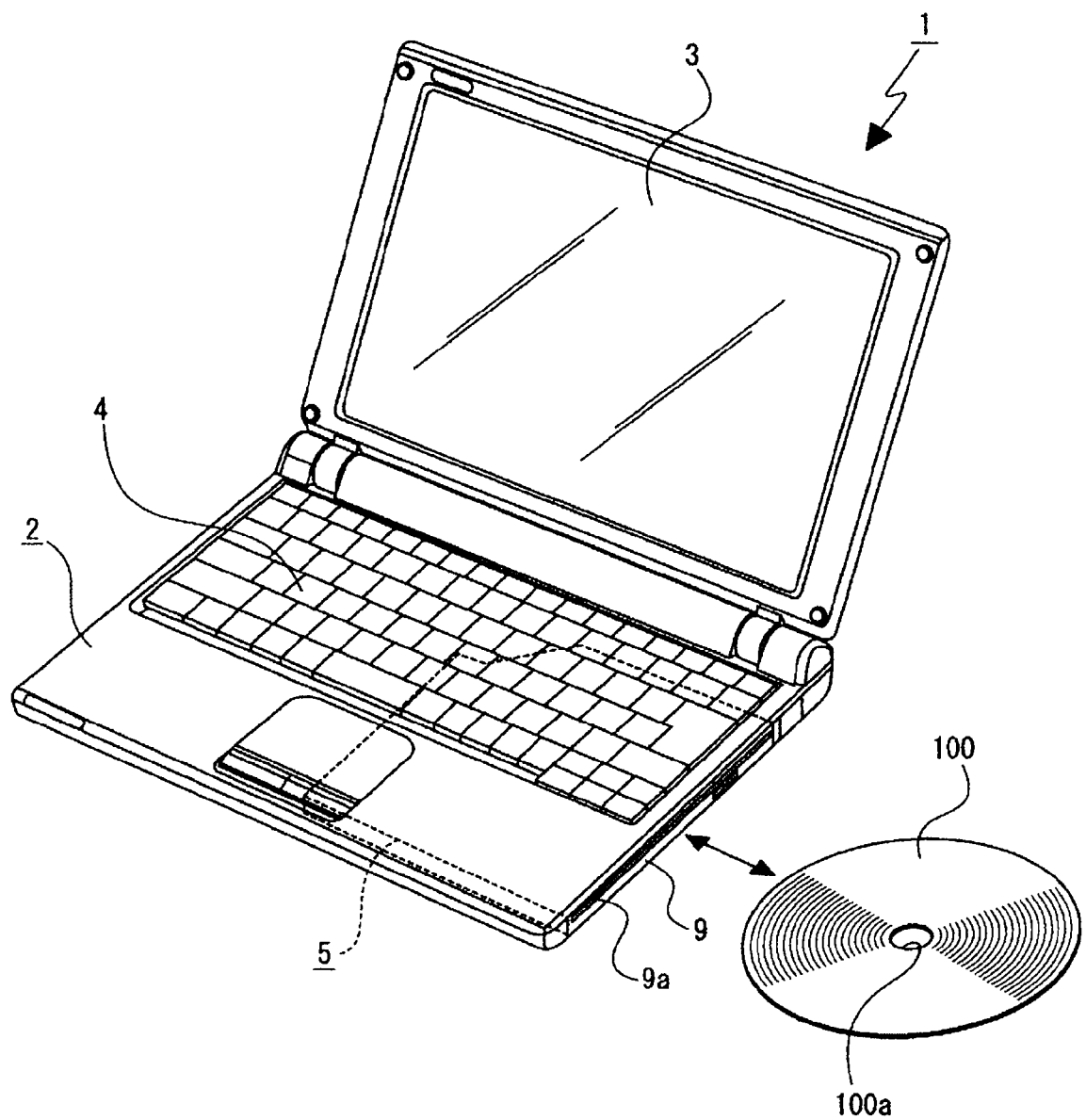
FIG. 1 is a perspective view showing a PC as an electronic device according to an embodiment of the present invention.

An electronic apparatus (personal computer) 1 includes a main body 2, a display apparatus 3, and a keyboard 4 (see, FIG. 1), for example. The display apparatus 3 is rotatably supported by the main body 2. The keyboard 4 is provided on the main body 2 and includes required operation keys. It is to be noted that the electronic apparatus 1 may be a so-called desktop apparatus in which a main body and a keyboard apparatus are separately provided, for example.

To the main body 2, a disk drive apparatus 5 is provided. For convenience, in the following description on the disk drive apparatus 5, a disk insertion side thereof is assumed to be a front side, while an opposite side thereof toward which the disk is inserted is assumed to be a back side, and thus directions from front to back and from side to side are defined in a state where a user inserts a disk 100 into a disk insertion slot.

Figure 2:
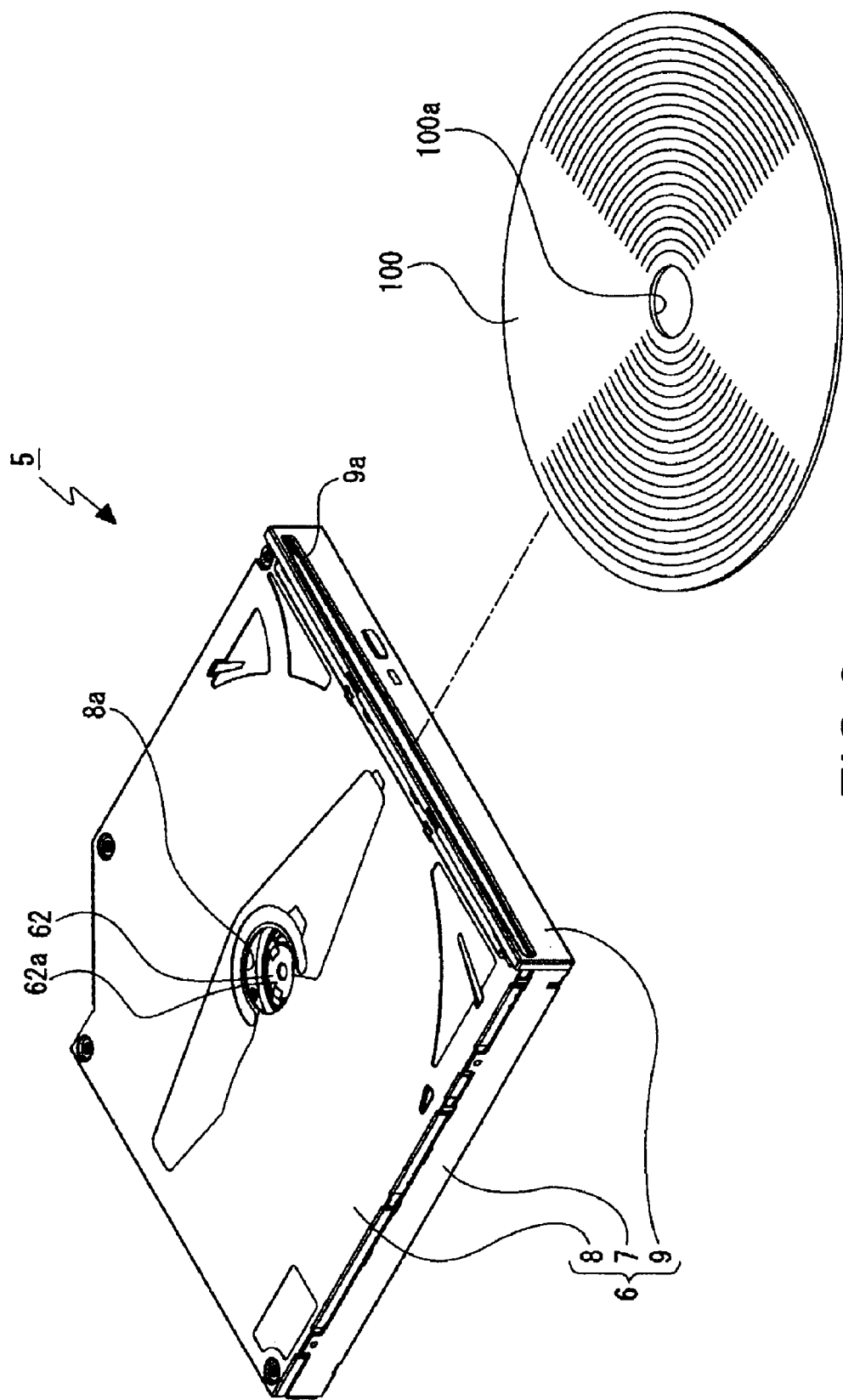
FIG. 2 is a perspective view showing a disk and a disk drive apparatus according to an embodiment of the present invention.

The disk drive 5 is formed to have a flat, approximately rectangular shape, and is constituted by disposing required portions in a case 6 (see FIG. 2). The case 6 includes a lower shell 7, an upper shell 8, and a front panel 9. The lower shell 7 forms a shallow box shape and is opened upward and forward except for some parts. The upper shell 8 blocks the lower shell 7 from the upper side. The front panel 9 is attached to a front end of the lower shell 7.

The upper shell 8 has an opening 8a formed in a center portion thereof.

The front panel 9 has a disk insertion slot 9a formed thereon. The disk insertion slot 9a is horizontally long so as to correspond to a shape of the disk 100, and is opened/closed by a shutter (not shown).

Figure 4:
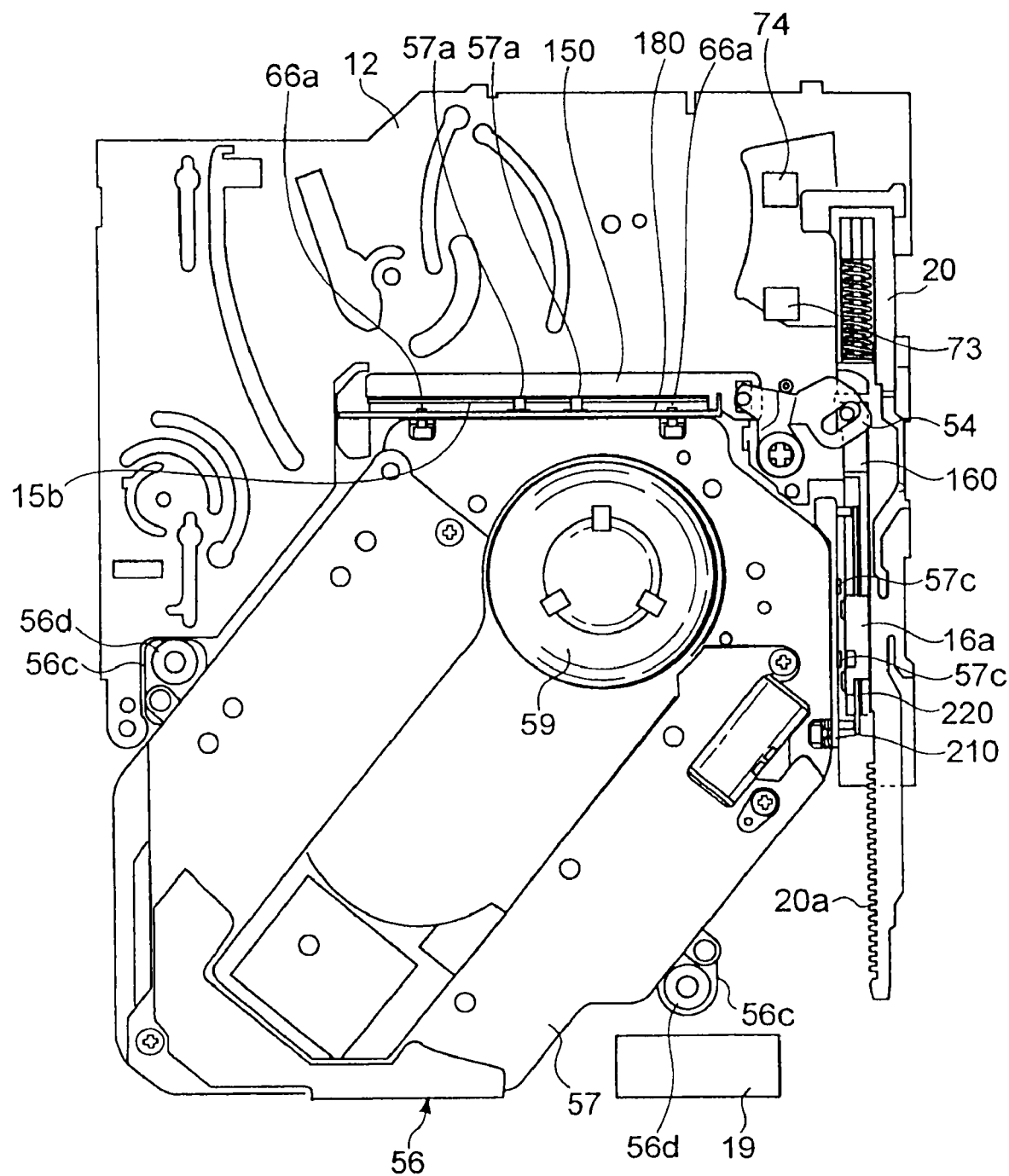
FIG. 4 is a schematic plan view of the disk drive apparatus.

FIG. 4 is a plan view showing an inner structure of the disk drive apparatus 5.

The lower shell 7 is provided with a support surface 10 on a right end portion thereof. The support surface 10 is formed at a raised portion as compared to the other portions. The other portions than the support surface 10 is formed as a concave portion 11 opened upward.

On a bottom portion of the lower shell 7, an opening portion 7a that vertically penetrates the bottom portion is formed. A right-side opening edge of the opening portion 7a is formed on the left of a left-side edge of the support surface 10.

Figure 3:
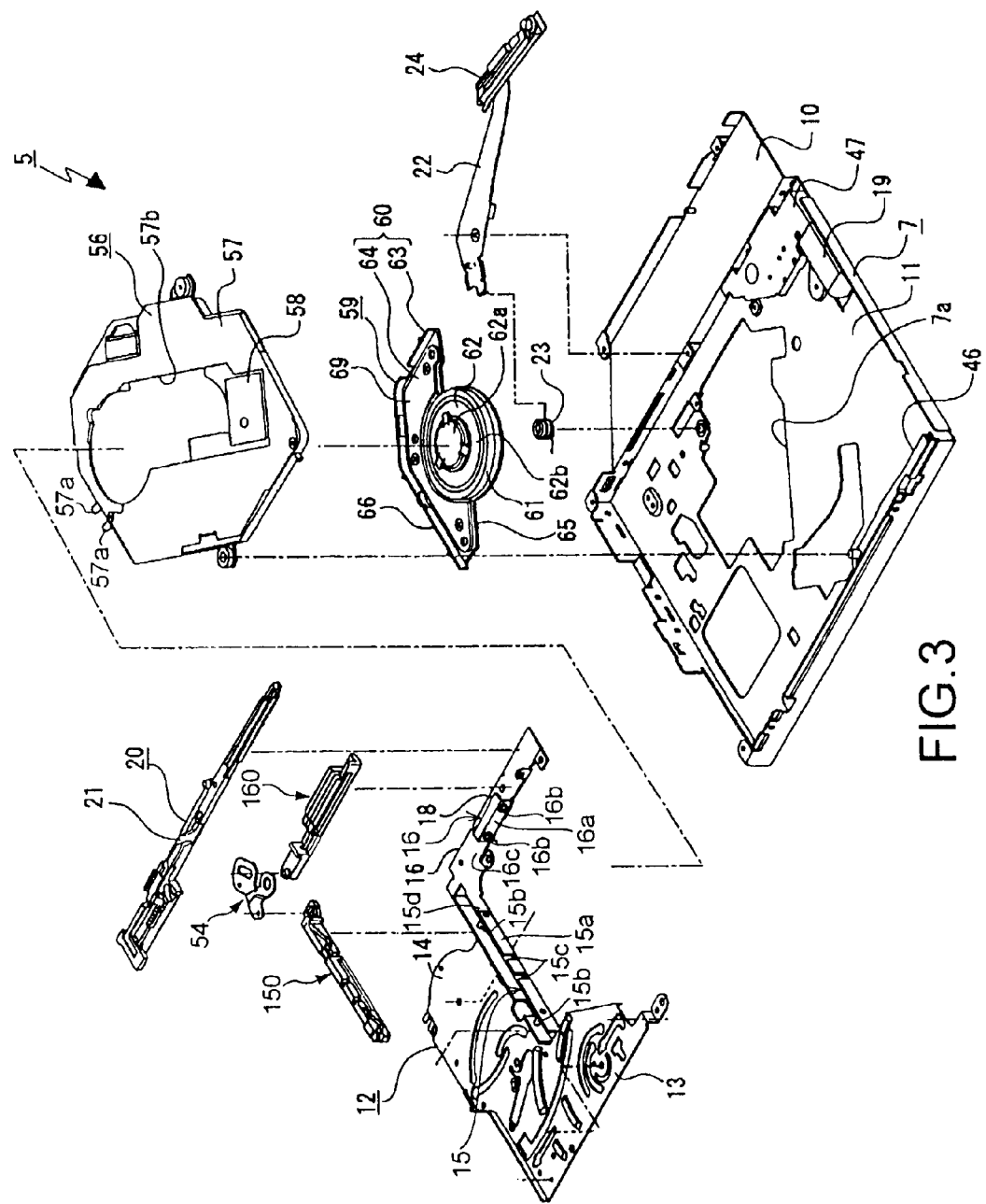
FIG. 3 is an exploded perspective view of the disk drive apparatus.

On the concave portion 11 of the lower shell 7, a chassis 12 is disposed (see, FIG. 3). As shown in FIG. 3, the chassis 12 includes a left side portion 13 and a right side portion 14. The left side portion 13 is positioned on the left side and is elongated in a forward and backward direction. The right side portion 14 protrudes rightward from a backside half portion of the left side portion 13. Further, the chassis 12 includes a slider support portion 16 and another slider support portion 15 that form an L-letter shaped portion. The slider support portion 16 forms one side of the L-letter shaped portion and extends forward. The slider support portion 15 forms the other side of the L-letter shaped portion and extends rightward and leftward.

The slider support portion 15 includes a support part 15a and a wall portion 15e. The support part 15a protrudes upward and extends rightward and leftward. The wall portions 15e is provided on a back side of the support part 15a in parallel to a longitudinal direction of the support part 15a. Between the support part 15a and the wall portion 15e, a region 15d in which a second slider 150 (see, FIGS. 3 and 6) is disposed is provided. On both of the right and left sides of the support part 15a, cam pins 15b, 15b are connected. The cam pins 15b, 15b are respectively engaged with the second slider 150. The second slider 150 will be described in detail below.

The slider support portion 16 includes a bottom portion 16c and a support part 16a that protrudes from a left-side edge of the bottom portion 16c. Roller pins 16b, 16b protrude rightward from the support part 16a. The roller pins 16b, 16b are engaged with a first slider 160. The first slider 160 will be described in detail below.

As shown in FIG. 3, on a right end side of a front end portion in the concave portion 11 of the lower shell 7, a drive motor (drive source) 19 is disposed. A worm (not shown) is fixed to a motor shaft of the drive motor 19.

In proximity to the drive motor 19, a reduction gear group (not shown) constituted by engaging a plurality of gears with each other is supported. The reduction gear group is engaged with the worm.

On the right end portion of the concave portion 11 of the lower shell 7, a main slider 20 is supported movably forward and backward (see, FIGS. 3 and 4).

Figure 12:
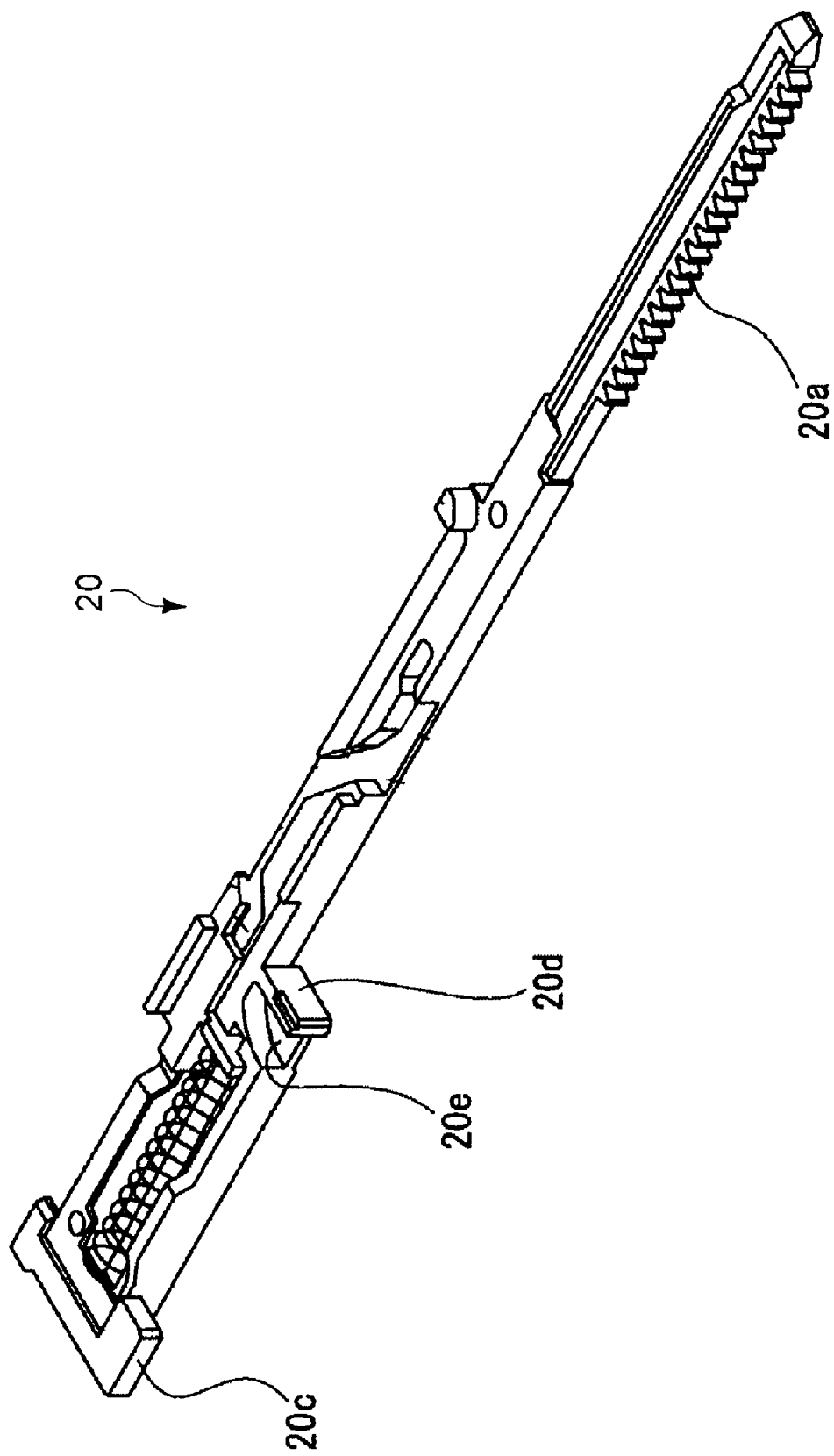
FIG. 12 is a perspective view showing a slider.

The main slider 20 is elongated in the forward and backward direction, and includes a rack 20a on a left side surface of the front end portion, as shown in FIG. 12. The rack 20a is engaged with the reduction gear group. When a driving force of the drive motor 19 is transmitted to the main slider 20 via the worm and the reduction gear group, the main slider 20 slides forward and backward according to a rotational direction of the drive motor 19.

At the back end portion of the main slider 20, a switch pressure portion 20c that protrudes leftward is provided. The switch pressure portion 20c functions as an operation source for a switching operation of detection switches 73 and 74 (see, FIG. 4) required for stopping a rotation of the drive motor 19.

Various members provided in the case 6 operate in conjunction with a slide movement of the main slider 20, thereby loading/ejecting the disk 100 into/from the case 6. Herein, a description on members for loading/ejecting the disk 100 is omitted.

The main slider 20 includes, on the left side of a shaft slide groove 21, a pressure surface 20d that faces forward. The pressure surface 20d has a function of pressing the first slider 160 described later. On a back side of the pressure surface 20d, an operation groove 20e that is opened leftward and upward is formed. The operation groove 20e has a function of returning the first slider 160 that has slid forward to a backward original position.

On the front end portion of the left side surface of the lower shell 7, a guide member 46 that extends forward and backward is attached (see, FIG. 3). On the guide member 46, a disk guide concave portion 46a that is opened rightward is formed.

To the front end of the right end portion of the concave portion 11 of the lower shell 7, a cover 47 is attached (see, FIGS. 3 and 4). The cover 47 covers over the worm (not shown) fixed to the motor shaft of the drive motor 19 and the reduction gear (not shown) engaged with the worm.

As shown in FIGS. 3 and 4, in the concave portion 11 of the lower shell 7, a pickup unit 56 is supported on a front side of the chassis 12, rotatably (movably upward and downward) in a direction in which the back end portion of the pickup unit 56 moves approximately vertically. The pickup unit 56 includes support portions 56c, 56c on the right and left sides thereof. The support portions 56c, 56c serve as support points in order that the pickup unit 56 moves upward and downward (rotates). To the support portion 56c, 56c, dampers 56d, 56d are provided, respectively. The pickup unit 56 is connected to the lower shell 7 via the damper 56d, 56d.

The pickup unit 56 includes a pickup base 57 and an optical pickup 58 that is supported movably in a radial direction of the disk 100 by the pickup base 57.

Figure 6:
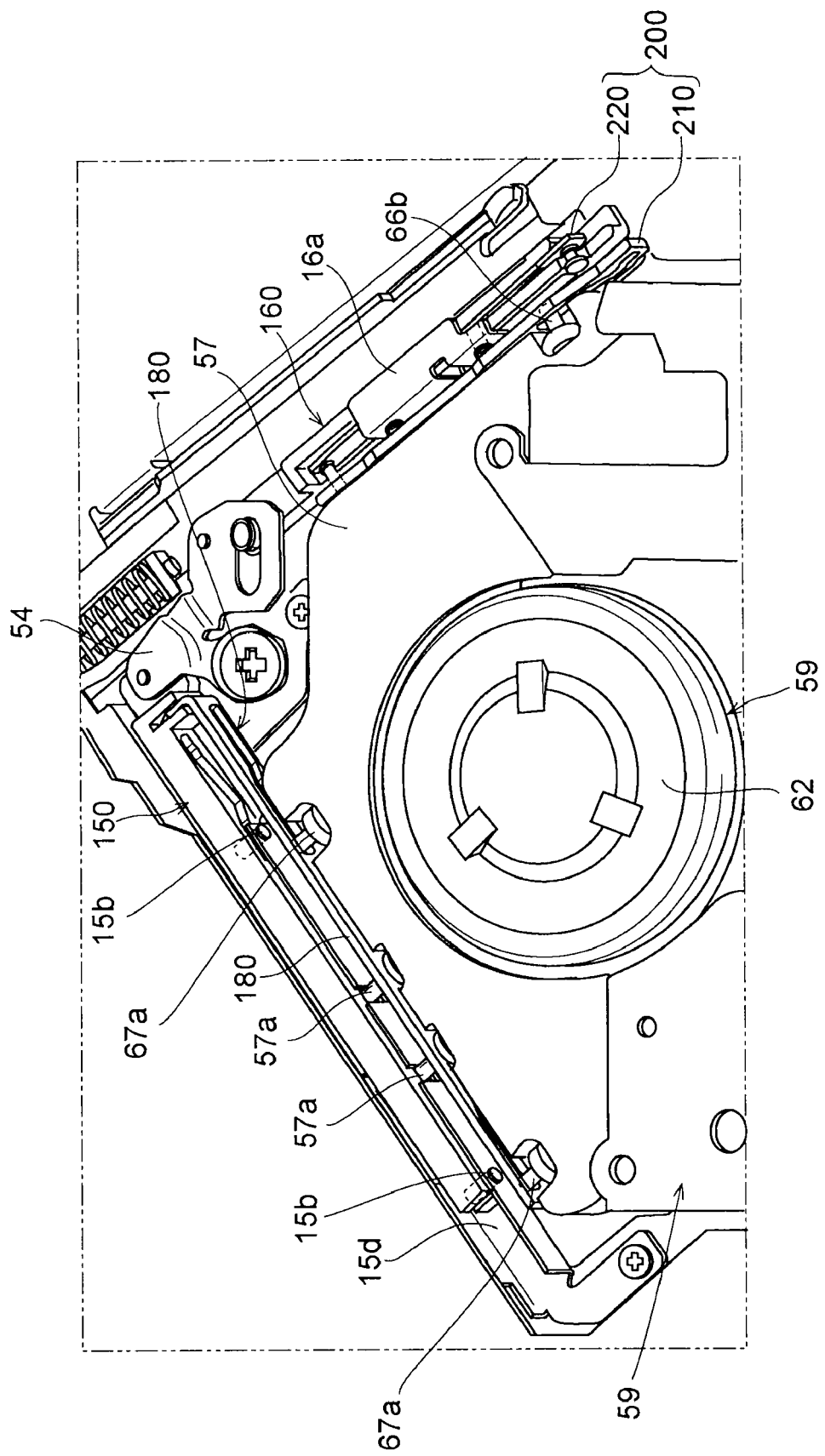
FIG. 6 is an enlarged perspective view of the chassis.

As shown in FIGS. 3, 4, and 6, on an outer peripheral surface of the pickup base 57, roller pins 57a, 57a that protrude backward and roller pins 57c, 57c that protrude rightward are provided. The roller pins 57c, 57c that protrude rightward are engaged with a first cam slider 210 described later. The roller pins 57a, 57a that protrude backward are engaged with the second slider 150 and a second cam slider 180 described later (see, FIGS. 17A and 17B).

The pickup base 57 has a placement hole 57b that vertically penetrates for placing therein the optical pickup 58, a spindle motor described later, and the like (see, FIGS. 3 and 4).

Figure 13:
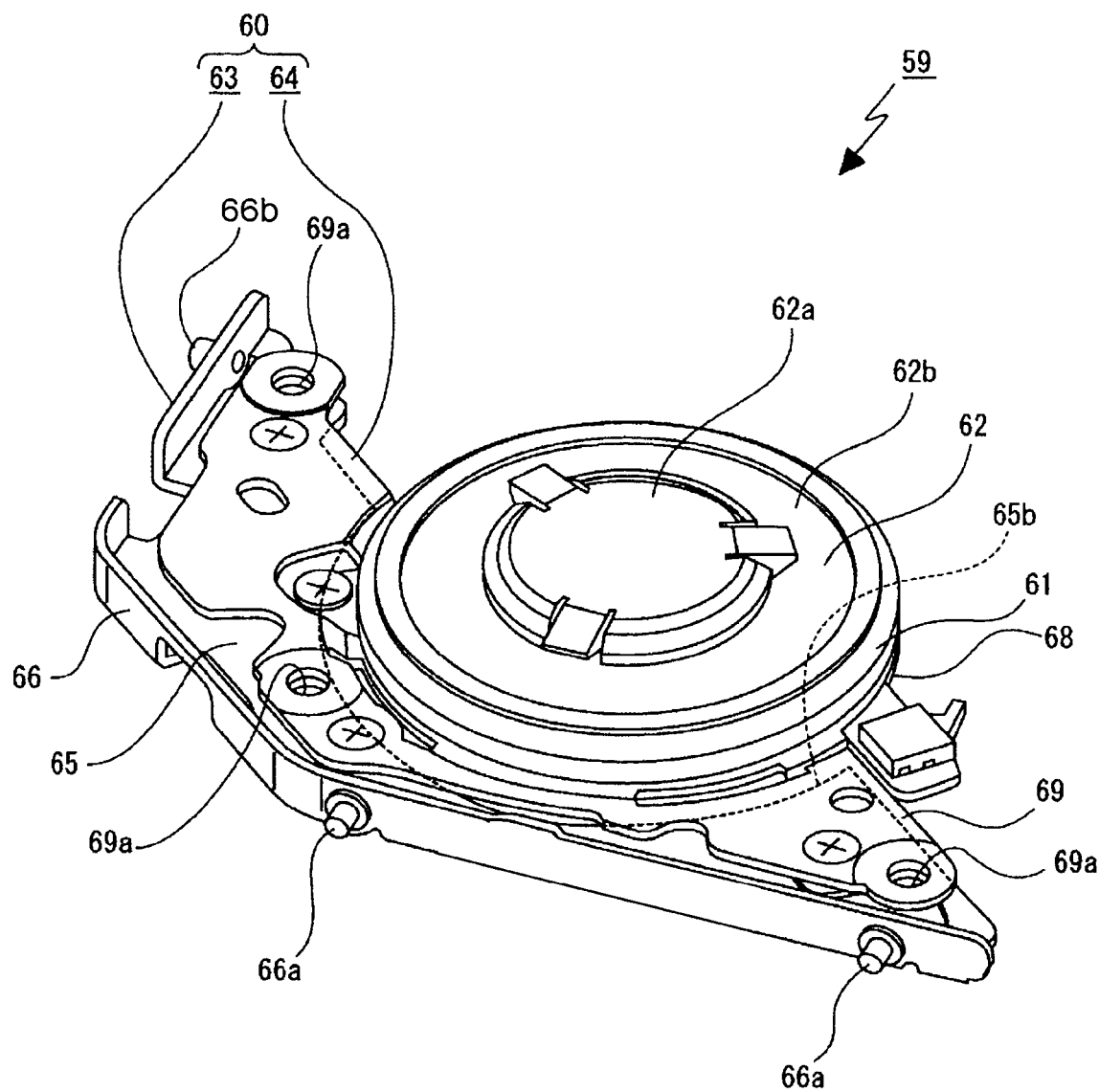
FIG. 13 is a perspective view showing the motor unit.

FIG. 13 is a perspective view showing a motor unit. A motor unit 59 includes a base 60, a spindle motor 61, and a disk table 62. The spindle motor 61 is disposed on the base 60. The disk table 62 is rotated by the spindle motor 61.

The disk table 62 includes a center ring protrusion portion 62a at a center thereof. On an outer peripheral side of the center ring protrusion portion 62a, a table portion 62b on which the disk 100 is mounted is provided.

The base 60 is constituted of a base plate 63 and a mounting plate 64 supported on the base plate 63.

The base plate 63 is constituted of a support plate portion 65 and a side plate portion 66. The support plate portion 65 faces in the upward and downward direction, and the side plate portion 66 protrudes upward from an edge portion of the support plate portion 65 on a back side and a right side. The support plate portion 65 has penetration holes 65a, 65a, 65a through which a jig 500 penetrates (see, FIG. 14). The support plate portion 65 has an arc-shaped notch 65b at an approximately center thereof (see, FIG. 13). To the side plate portion 66, cam pins 66a, 66a, and 66b that protrude toward outside are provided. The cam pins 66a, 66a are disposed on a surface of the side plate portion 66 extending rightward and leftward, while the cam pin 66b is disposed on a surface of the side plate portion 66 extending forward and backward.

Figure 14:
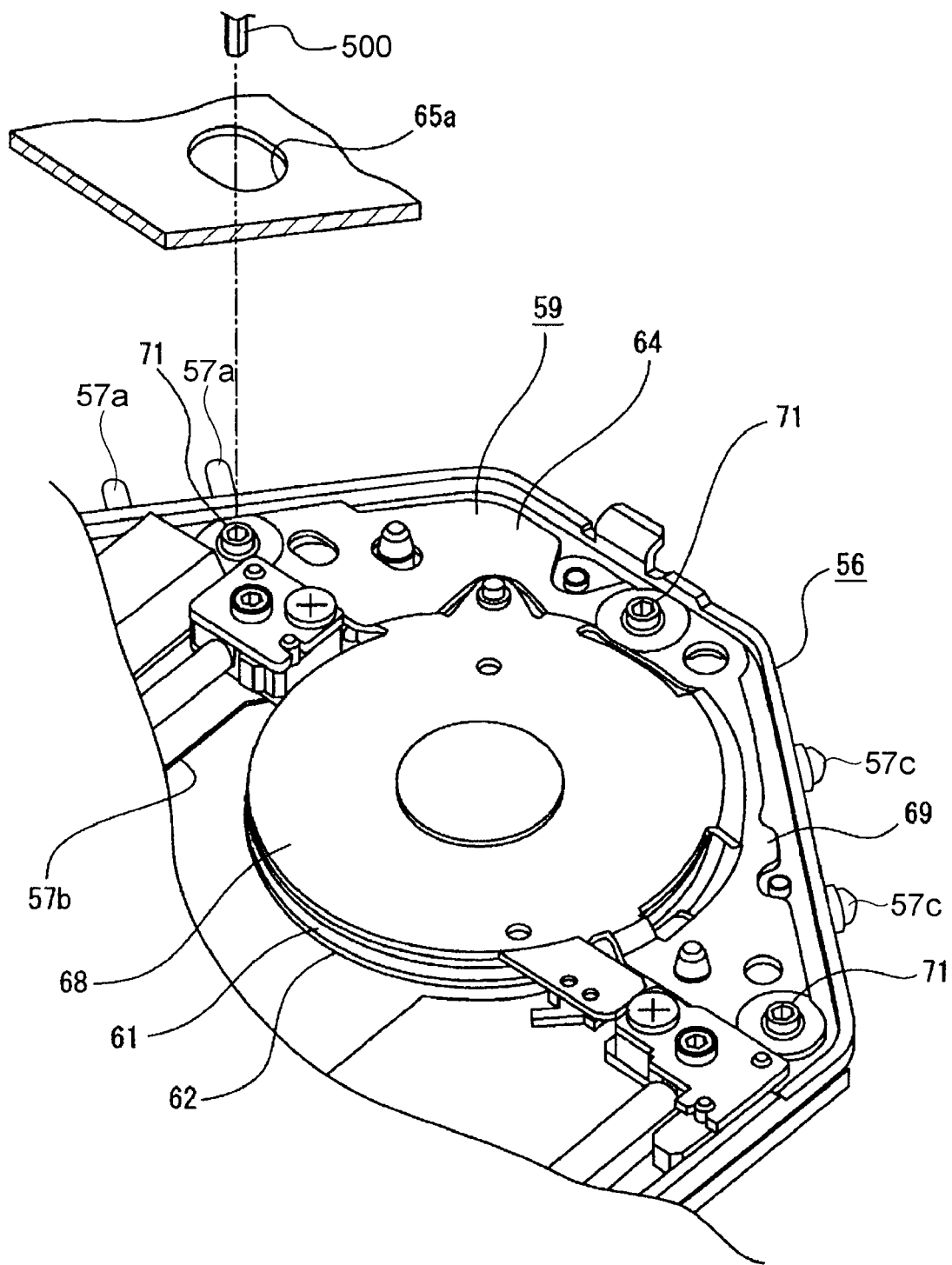
FIG. 14 is a perspective view showing a back side of a part of the pickup unit and the motor unit.
Figure 15:
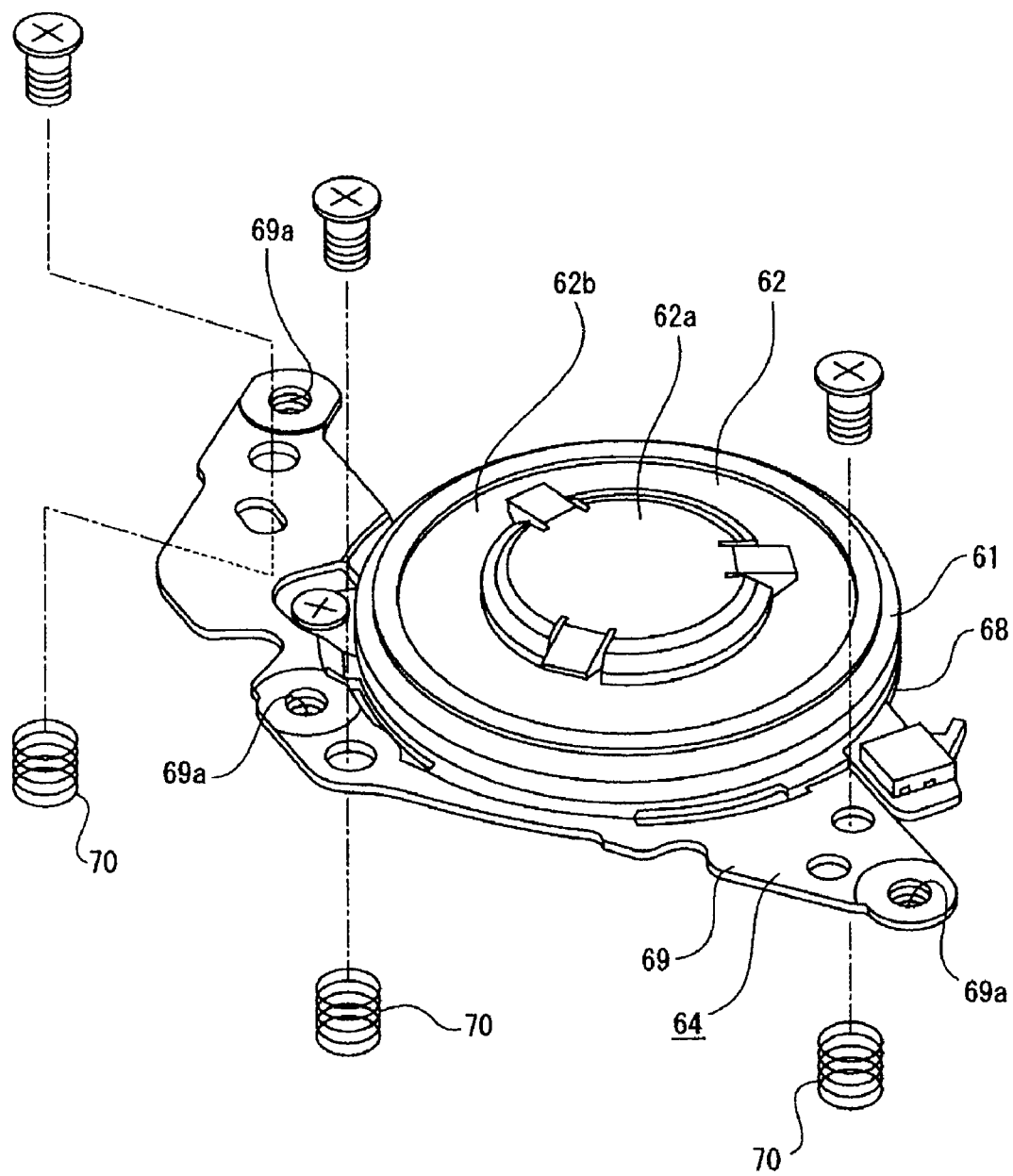
FIG. 15 is a perspective view showing the motor unit from which a base plate is detached.

As shown in FIGS. 13 to 15, the mounting plate 64 is constituted by integrally forming a disk-shaped motor mounting portion 68 and a supported portion 69 disposed outside the motor mounting portion 68. The mounting portion 64 is supported by a base plate 63 in a state where the motor mounting portion 68 is positioned corresponding to the notch 65b of the base plate 63, the supported portion 69 is positioned above the support plate portion 65, and spring portions 70, 70, 70 serving as compression coil springs are interposed between the mounting plate 64 and the support plate portion 65. Therefore, the mounting plate 64 can be displaced upward and downward with respect to the base plate 63, and is supported by the base plate 63 in a state of being biased upward.

The supported portion 69 of the mounting plate 64 includes adjustment portions 69a, 69a, 69a formed thereon, each of which has a threaded groove and is a threaded hole that vertically penetrates the supported portion 69 (see, FIGS. 13 and 15). On the motor mounting portion 68 of the mounting plate 64, the spindle motor 61 is mounted.

Figure 17A:
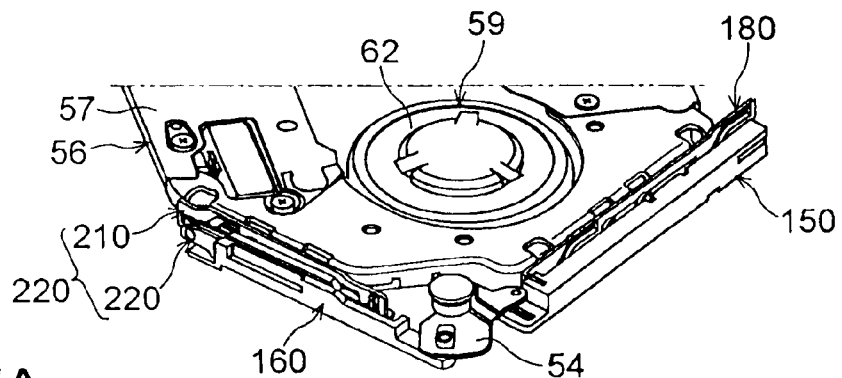
FIGS. 17A to 17D are perspective views each showing a state where the pickup unit, the motor unit, the first slider, the second slider, the moving member, and the second cam slider are located at initial positions (in initial states)
Figure 17B:
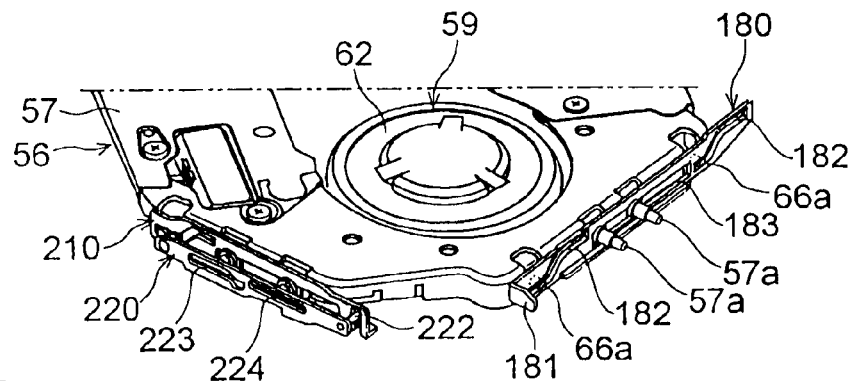
Figure 17C:
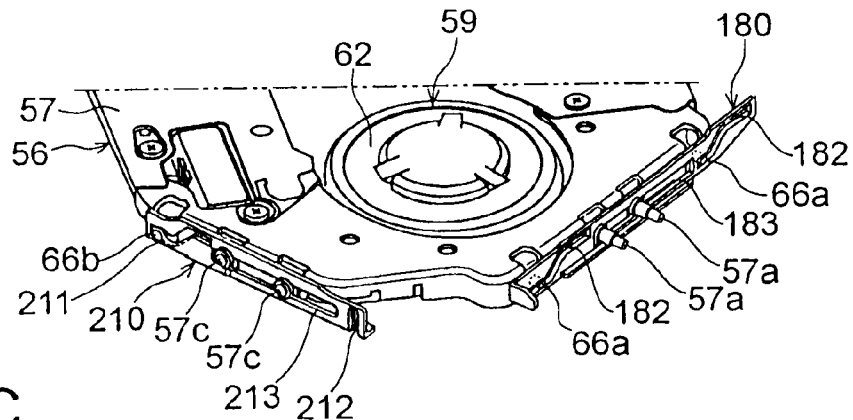

As shown in FIGS. 17A to 17C, in the motor unit 59, the cam pin 66b of the base plate 63 is engaged with the first cam slider 210 described later. The cam pins 66a, 66a are engaged with the second cam slider 180.

As described above, the roller pins 57c, 57c are engaged with the first cam slider 210, while the roller pins 57a, 57a are engaged with the second cam slider 180. Accordingly, the motor unit 59 is supported by the pickup unit 56 via the first cam slider 210 and the second cam slider 180.

Figure 7A:
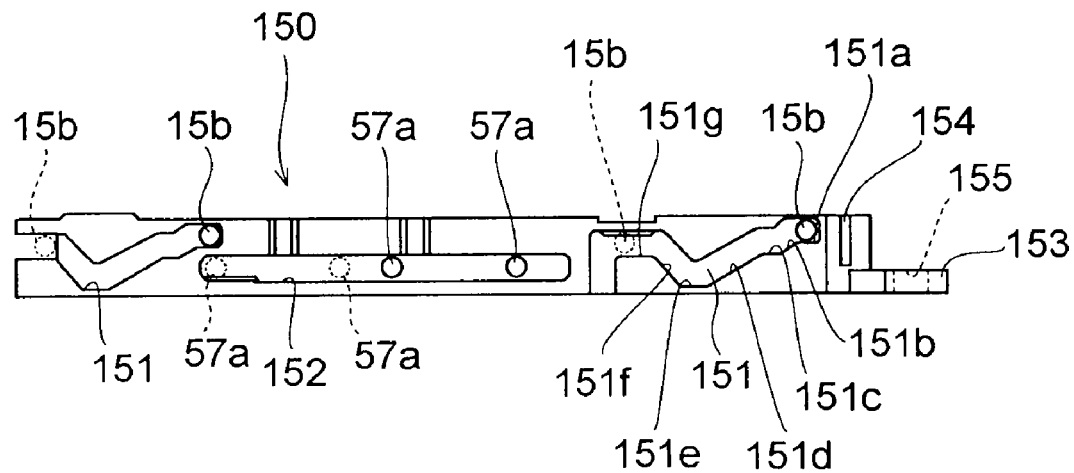
Figure 7B:
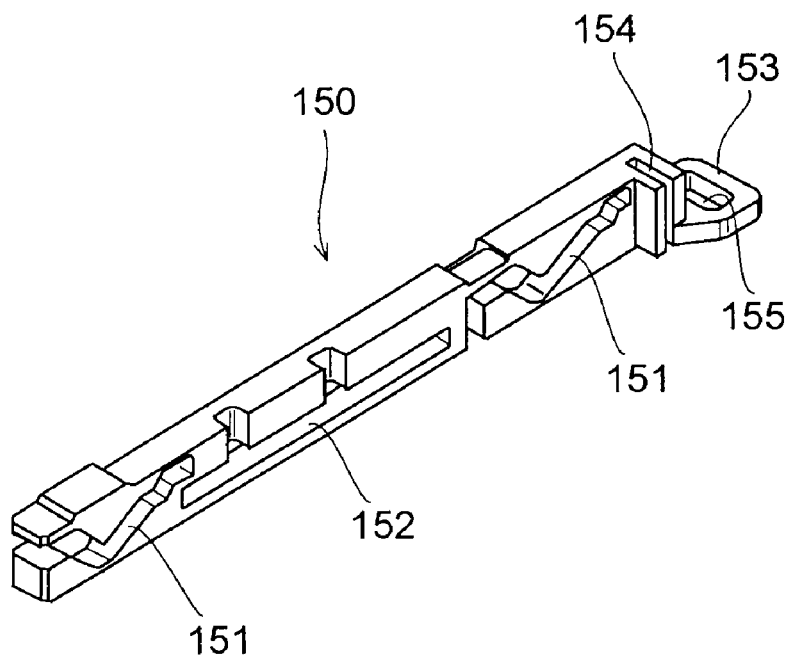

FIG. 7A is a front view of the second slider 150, and FIG. 7B is a perspective view of the second slider 150.

Figure 5:
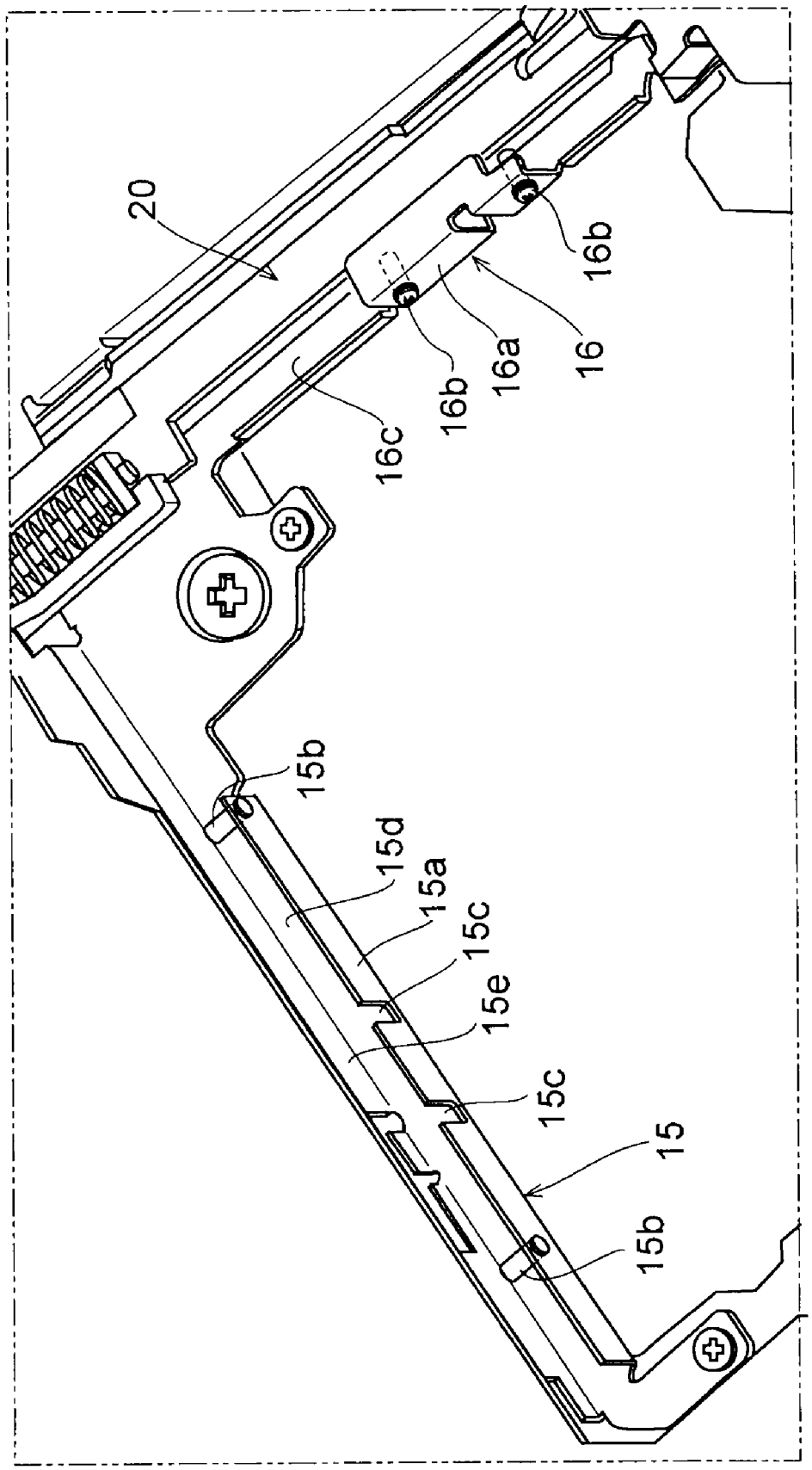
FIG. 5 is a partial perspective view showing a state where a pickup unit, a first slider, a second slider, and the like are removed from a chassis.

On both sides of a front surface of the second slider 150, cam grooves 151, 151 with which the cam pins 15b, 15b (see, FIG. 5) are engaged are provided. With this structure, when the second slider 150 slides rightward and leftward, in conjunction with this, the second slider 150 moves upward and downward. Further, between the cam grooves 151, 151 of the second slider 150, an elongate hole 152 that is elongated rightward and leftward is formed. At a center of the support part 15a of the slider support portion 15, notches 15c, 15c are formed. The roller pins 57a, 57a provided on the side surface of the pickup unit 56 are engaged slidably rightward and leftward with the elongate hole 152 of the second slider 150 via the notches 15c, 15c.

The cam grooves 151, 151 each include a first horizontal portion 151a corresponding to an initial position of the cam pin 15b. Herein, the "initial position" of each of the cam pin 15b and other various members means a position of a member in a state where the disk 100 is not inserted in the case 6, or the disk 100 is being inserted and the drive motor 19 does not still operate.

The cam grooves 151, 151 further includes, continuously with the first horizontal portion 151a, a first incline portion 151b, a second horizontal portion 151c, a second incline portion 151d, a third horizontal portion 151e, a third incline portion 151f, and a fourth horizontal portion 151g that is a final position of the cam pins 15b. The "final position" of each of the cam pins 15b and other various members means a position of each member in a state where an information signal can be recorded on the disk, or the recorded information signal can be reproduced.

The first horizontal portion 151a is formed at a higher position than the fourth horizontal portion 151g. When the cam pins 15b, 15b are located at the first horizontal portion 151a, the pickup unit 56 engaged with the second slider 150 is located at the initial position as a lowermost position.

The second horizontal portion 151c is not necessarily required. Alternatively, the second horizontal portion 151c may incline, for example, about 0.5 to 5 degrees from a horizontal position thereof.

With the above-described structure of the second slider 150, the second slider 150 slides rightward and leftward, to thereby move the pickup unit 56 upward and downward.

On a right side of the second slider 150, a slit 154 that extends forward and backward is formed. To the slit 154, the second cam slider 180 (the first cam slider 210 will be described later) is connected. The right-side portion of the second cam slider 180 forms an L-letter shape as shown in the plan view of FIG. 8. An L-letter portion 181 (see, FIG. 8) is fitted into the slit 154 to be fixed. With this structure, the second cam slider 180 slides integrally with a rightward and leftward slide of the second slider 150.

As shown in FIG. 17B, the second cam slider 180 includes cam grooves 182, 182 on the both sides thereof. Pins 67a, 67a provided to the motor unit described later are engaged with the cam grooves 182, 182, respectively. The second cam slider 180 further includes, between the cam grooves 182 and 182, an elongate hole 183 with which the roller pins 57a, 57a are slidably engaged.

With this structure, the second cam slider 180 slides integrally with the second slider 150, to thereby move the pickup unit 56 upward and downward, and move the left side portion of the motor unit 59. In addition, as described in the following, the first cam slider 210 slides in synchronization with the second cam slider 180, to thereby move the right side portion of the motor unit 59 upward and downward.

Figure 8:
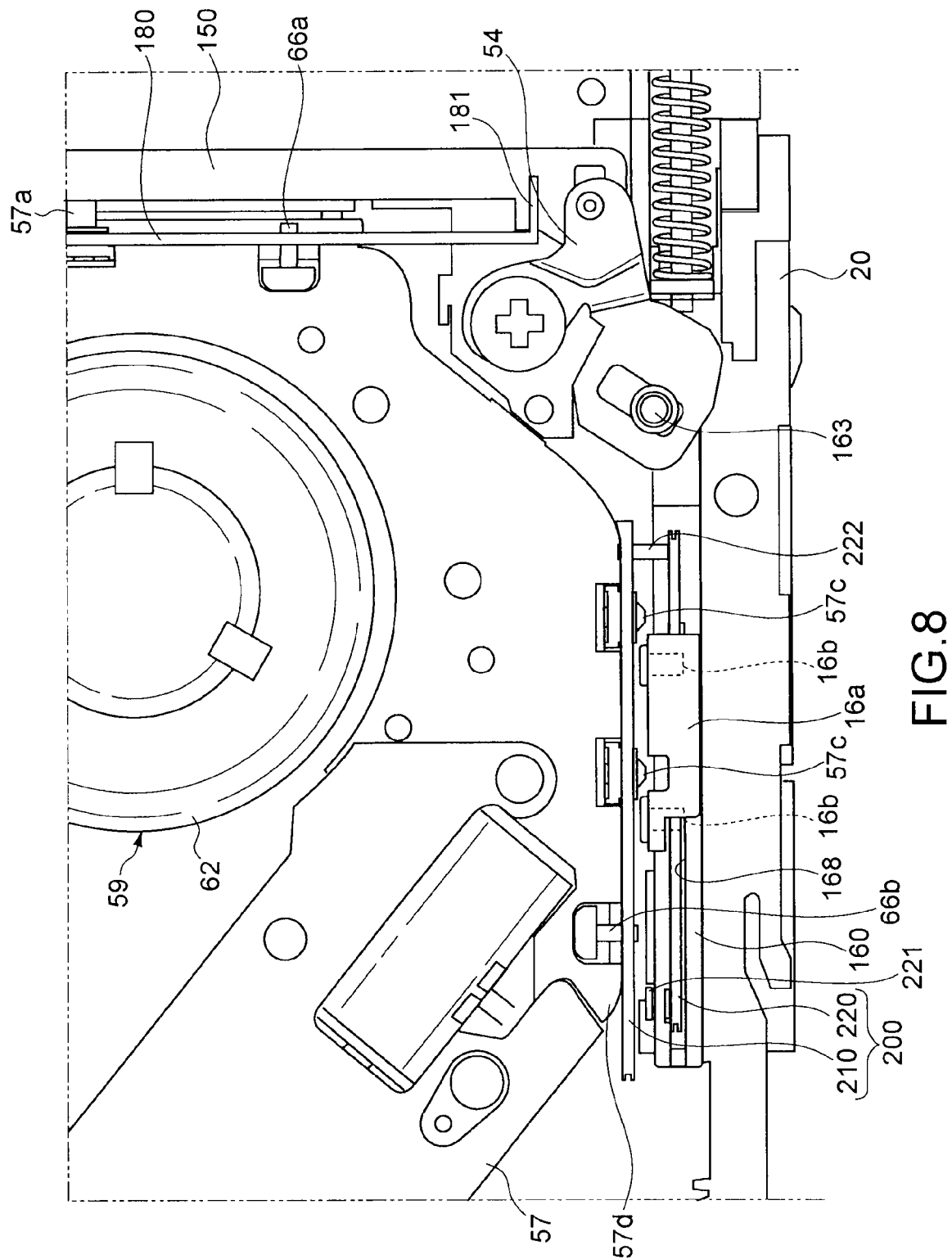
FIG. 8 is a plan view showing the first slider and members therearound.
Figure 9:
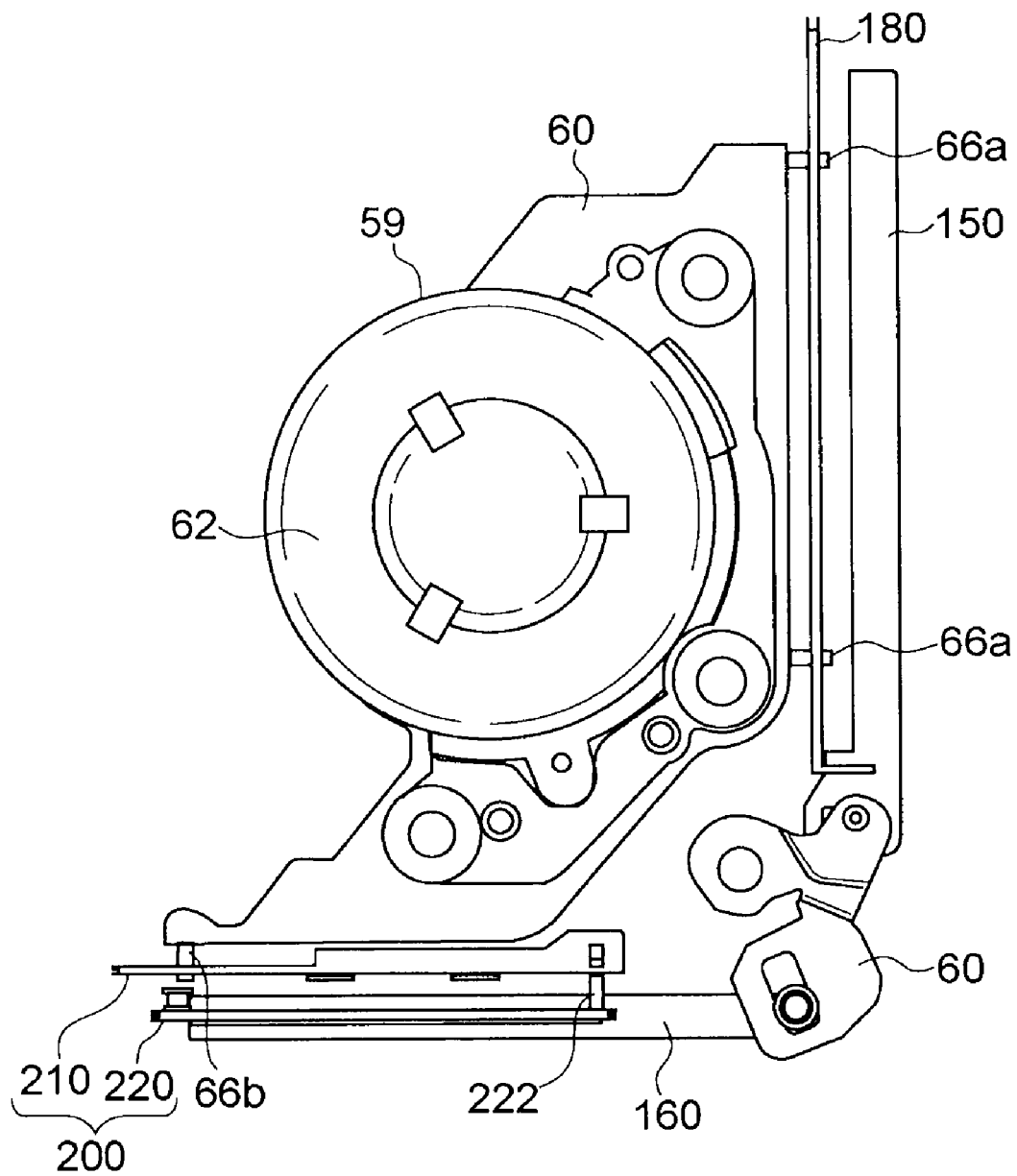
Figure 18:
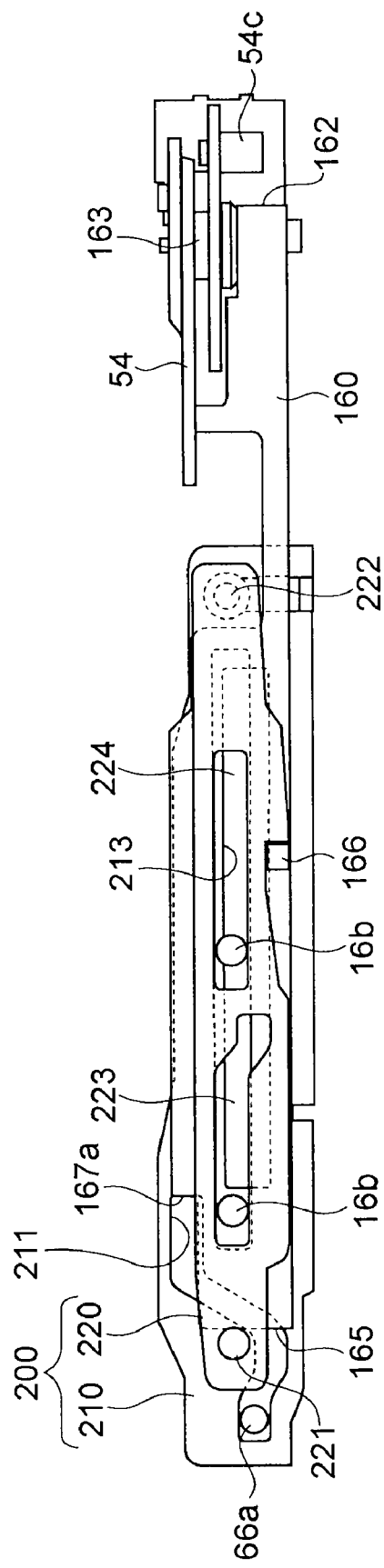
FIG. 18 is a cross sectional view of FIG. 8 taken along the line A-A in the initial state.

FIG. 8 is a plan view showing the first slider 160 and members therearound. FIG. 9 is a plan view showing the first slider 160, the second slider 150, the motor unit 59, and the like. FIG. 18 is a cross-sectional view taken along the line A-A of FIG. 8. It should be noted that FIG. 8 shows a state where the members are located at the final positions.

Figure 10:
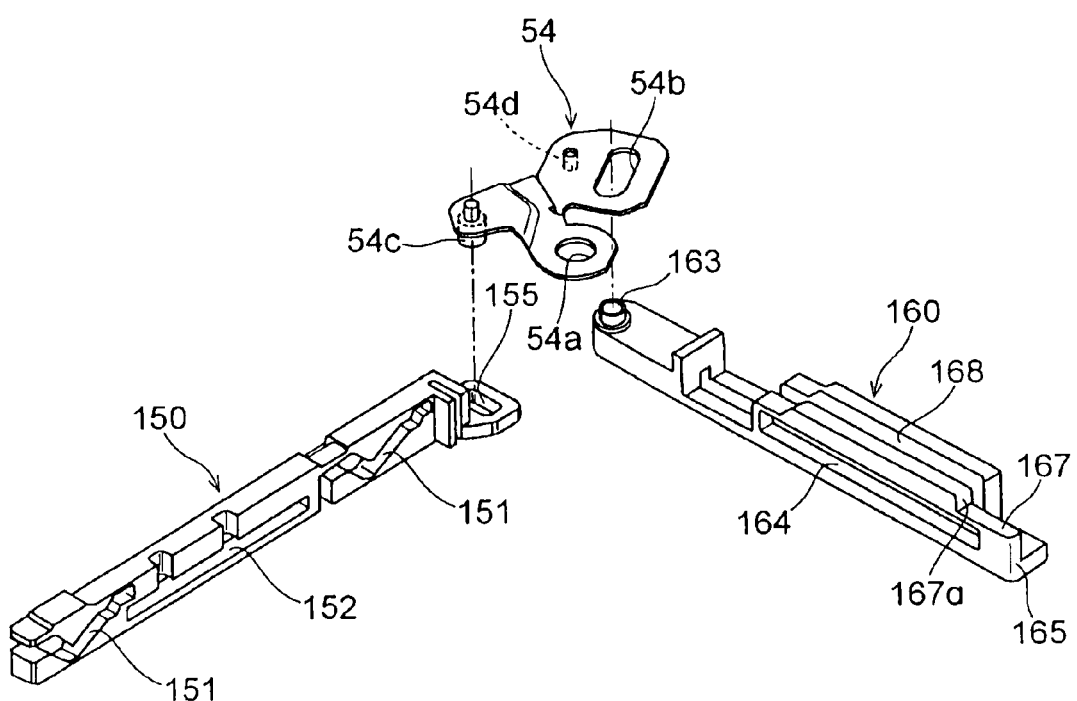
FIG. 10 is a perspective view showing the first slider, the second slider, and a link lever.

As described above, the first slider 160 is engaged with the roller pins 16b, 16b that protrude from the support part 16a. As shown in FIGS. 18 and 10, for example, the first slider 160 has an elongate hole 164 that extends in a horizontal direction. To the elongate hole 164, the roller pins 16b, 16b are engaged.

The first slider 160 includes a back surface 162. The back surface 162 is pressed by the pressure surface 20d of the main slider 20 after a predetermined time period from when the first slider 160 is brought into the initial position.

With this structure of the first slider 160, according to the forward and backward slide of the main slider 20, the first slider 160 can slide forward and backward (in a first direction) with respect to the chassis 12.

The first slider 160 and the second slider 150 are connected through a link lever 54. As shown in FIG. 10, the link lever 54 has a rotation center hole 54a provided at a center thereof, an elongate hole 54b provided on a right side thereof, and a pin 54c provided on a left side thereof. A screw 101 passes through the rotation center hole 54a so that the link lever 54 can rotate with the rotation center hole 54a as a center, and is provided to the chassis 12.

A shaft pin 163 provided to a back portion of the first slider 160 is engaged with the elongate hole 54b of the link lever 54. The pin 54c is engaged with an elongated connection hole 155 provided to a right end portion 153 of the second slider 150.

With this structure of the link lever 54, when the first slider 160 slides forward (backward), in accordance with this, the second slider 150 slides rightward (leftward). The link lever 54 functions as a link mechanism such that moving speeds of the first slider 160 and the second slider 150 are the same (at a ratio of 1:1).

Further, the link lever 54 includes a protrusion portion 54d that protrudes downward on a back side portion of the elongate hole 54b. The protrusion portion 54d is engaged with an operation groove 20e of the main slider 20. When the main slider 20 returns backward (to the initial position), the protrusion portion 54d moves along an arc portion of the operation groove 20e while pressing the arc portion. With this structure, in conjunction with the return movement of the main slider 20 to the initial position, the link lever 54 rotates to return to the initial position. As a result, the first slider 160 slides to the backward initial position.

As shown in FIG. 10, the first slider 160 has a slit 168 at a center thereof along a longitudinal direction thereof. As shown in FIGS. 8 and 18, at the slit 168, an assist slider 220 that constitutes a part of a moving member 200 is disposed movably in the slit 168. The assist slider 220 has a cam groove 223 on a front side thereof, and a linear groove 224 on a back side thereof. With the cam groove 223 and the linear groove 224, the roller pins 16b, 16b are engaged via the elongate hole 164 of the first slider 160.

The assist slider 220 includes, on a front end portion thereof, a roller 221 that protrudes leftward. The roller 221 is disposed at a position nearly in contact with a front end surface 165 (see, FIGS. 10 and 18) of the first slider 160. With this structure, when the first slider 160 slides forward, the first slider 160 presses the roller 221, and thus the assist slider 220 slides forward along with the slide of the first slider 160.

The first slider 160 includes a horizontal step portion 167 in an upper portion on the front side of the first slider 160. As described later, the roller 221 of the assist slider 220 starts to travel on the step portion 167 at a time point when the first slider 160 slides a predetermined distance after the first slider 160 starts to slide.

Figure 11:
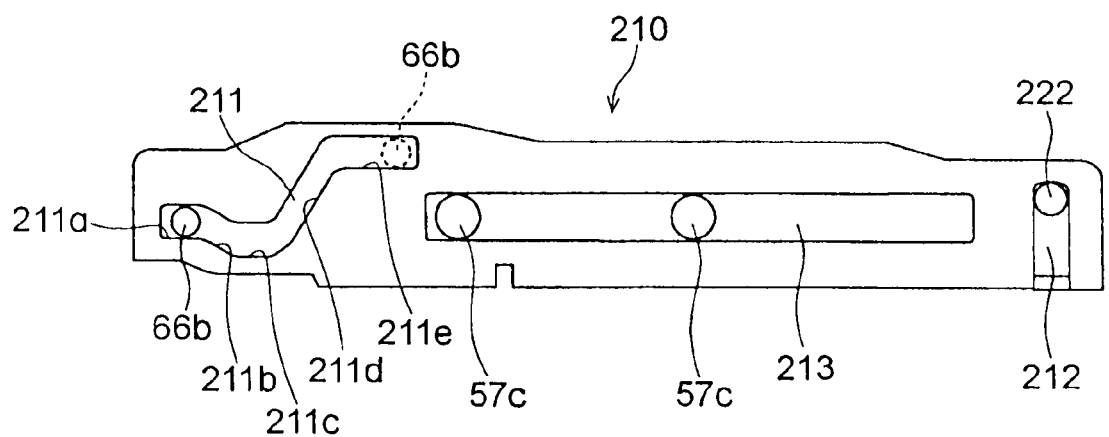
FIG. 11 is a right-side view showing a first cam slider that constitutes a part of a moving member.

FIG. 11 is a right side view showing the first cam slider 210 that constitutes a part of the moving member 200. The first cam slider 210 has a cam groove 211 provided on a front side thereof, an elongate hole 213 provided at a center portion thereof in a longitudinal direction, and a vertical groove 212 provided on a back end portion thereof.

The roller pins 57c, 57c provided on the side of the pickup unit 56 are engaged with the elongate hole 213 (see, FIGS. 8 and 11).

As shown in FIG. 8, the cam pin 66b provided on the side of the motor unit is engaged with the cam groove 211 of the first cam slider 210. The cam groove 211 includes a first horizontal portion 211a located at a position corresponding to the initial position of the cam pin 66b. The cam groove 211 includes, continuously with the first horizontal portion 211a, a first incline portion 211b, a second horizontal portion 211c, a second incline portion 211d, and a third horizontal portion 211e. The cam groove 182 of the second cam slider 180 has substantially the same shape as the cam groove 211.

Figure 19A:
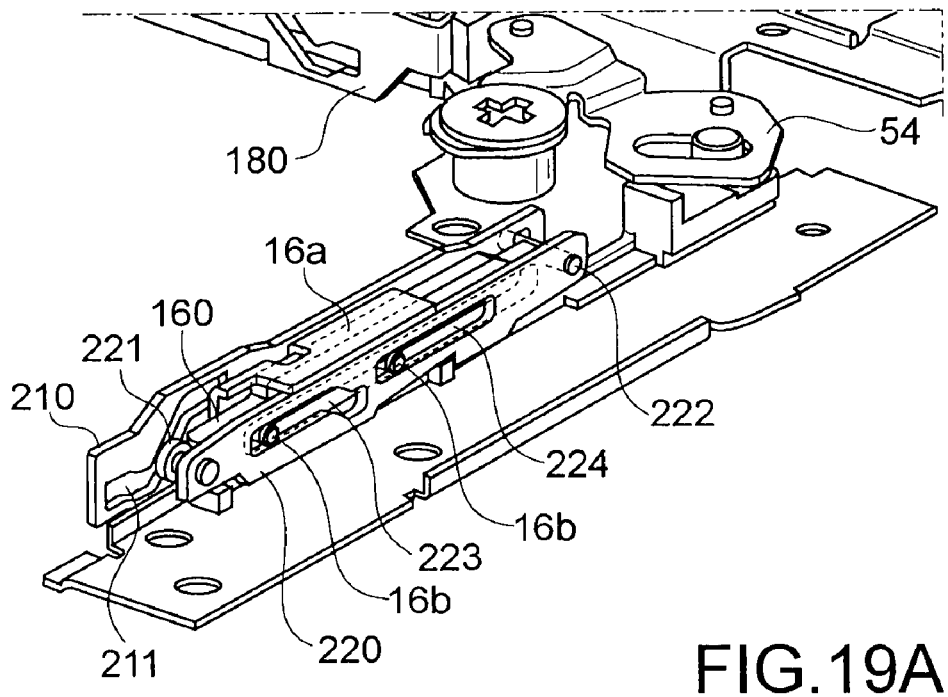
FIGS. 19A and 19B are perspective views of the first slider and the moving member, respectively.
Figure 19B:
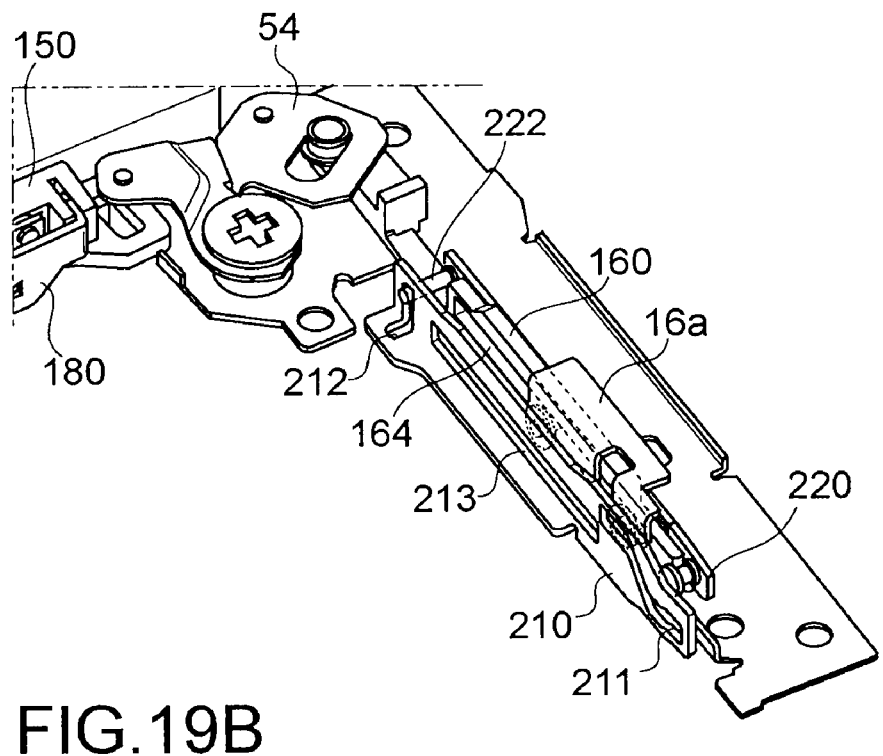

As shown in FIGS. 19A and 19B, at a back end portion of the assist slider 220, a protrusion pin 222 that protrudes leftward is provided. The protrusion pin 222 is engaged with the vertical groove 212 of the first cam slider 210. With the assist slider 220 that slides in conjunction with the slide of the first slider 160, the protrusion pin 222 presses the vertical groove 212 forward and backward, to thereby cause the first cam slider 210 to slide forward and backward. That is, the assist slider 220 and the first cam slider 210 integrally move forward and backward.

It is to be noted that the vertical groove 212 is formed in a vertically long shape because the first cam slider 210 moves upward and downward along with the pickup unit 56 in a vertical direction. That is, the vertical groove 212 is formed so as to secure a passageway for the protrusion pin 222 in the vertical direction when the pickup unit 56 moves upward and downward.

The pickup unit 56 and the motor unit 59 move upward and downward integrally with each other. Therefore, in a state where the pickup unit 56 and the motor unit 59 move integrally, an upper surface of the base 60 (upper surface of the mounting plate 64) of the motor unit 59 is in contact with a lower surface of the pickup base 57. Further, in a state where the disk 100 is mounted on the disk table 62, the upper surface of the base 60 is also in contact with the lower surface of the pickup base 57.

In this case, the base 60 has a structure in which the mounting plate 64 can be displaced with respect to the base plate 63 by the spring members 70, 70, 70. Therefore, the upper surface of the mounting plate 64 is pressed against the lower surface of the pickup base 57 while being in contact therewith. As a result, a contact state of the mounting plate 64 with the pickup base 57 can be stabilized.

Hereinafter, a description will be given on an operation of a disk drive apparatus 5 when the disk 100 is loaded and ejected.

When the disk 100 is inserted from the disk insertion slot 9a of the front panel 9, the drive motor 19 drives the main slider 20 to start to slide forward. Various kinds of lever members and arm members move in conjunction with the slide of the main slider 20, thereby causing the disk 100 to move to a position just above the disk table 62. At this time, the pickup unit 56 and the motor unit 59 are positioned at the initial positions, and are not still moved.

Figure 16:
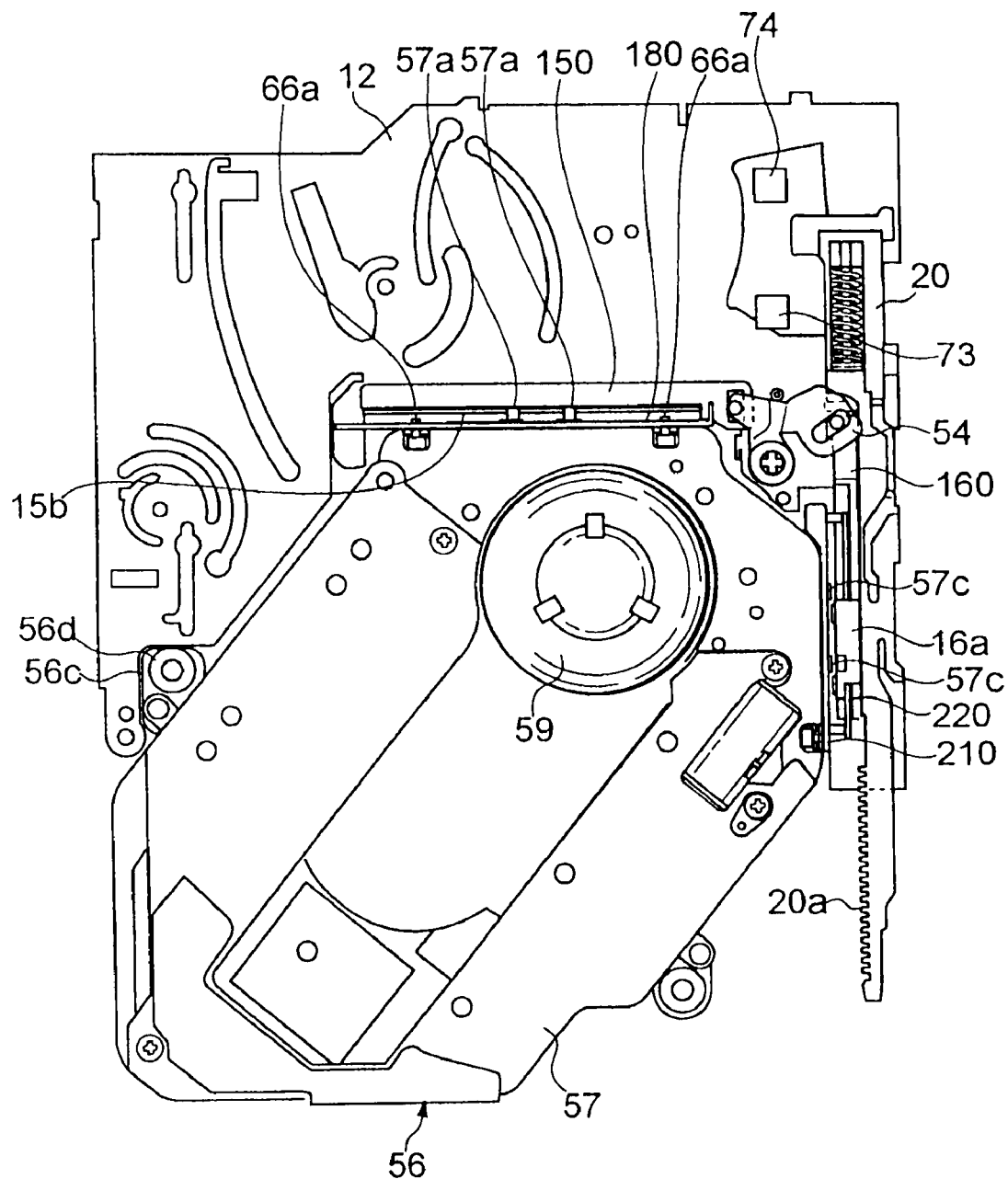
FIG. 16 is a plan view showing a main portion of the disk drive apparatus in a state where the pickup unit and the motor unit are located at initial positions.

FIG. 16 is a plan view showing a main part of the disk drive apparatus 5 in a case where the pickup unit 56 and the motor unit 59 are in the initial positions.

Figure 17D:
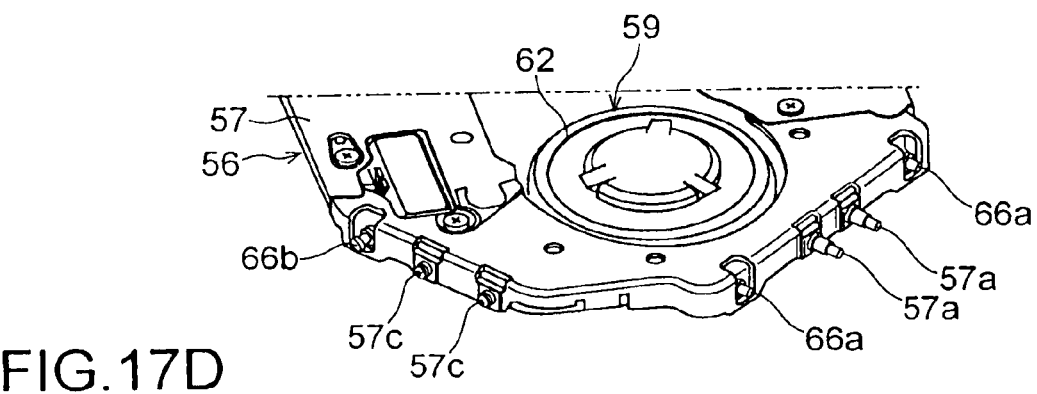

FIG. 17A is a perspective view showing a state (initial state) where the pickup unit 56, the motor unit 59, the first slider 160, the second slider 150, the moving member 200, and the second cam slider 180 are in the initial positions. FIG. 17B is a perspective view showing a state where the first slider 160 and the second slider 150 are removed from the members shown in FIG. 17A. FIG. 17C is a perspective view showing a state the assist slider 220 is removed from the members shown in FIG. 17B. FIG. 17D is a perspective view showing a state where the first cam slider 210 and the second cam slider 180 are removed from the members shown in FIG. 17C. Timings of the states shown in FIGS. 17A to 17D are the same.

FIG. 18 is a cross-sectional view of FIG. 8 in the initial state described above. FIG. 19A is a perspective view of the first slider 160 and the moving member 200 viewed from a left side at the same timing as FIG. 18. FIG. 19B is a perspective view of the first slider 160 and the moving member 200 viewed from a right side of FIG. 19. Timings of the states shown in FIGS. 18, 19A, and 19B are the same.

When the disk 100 moves to the position just above the disk table 62 because of the forward slide of the main slider 20, the pressure surface 20d of the main slider 20 is brought into contact with the back surface 162 of the first slider 160, and starts to press the first slider 160. Thus, the first slider 160 starts to slide forward.

When the first slider 160 starts to slide, the front end surface 165 of the first slider 160 presses the roller 221, the assist slider 220 starts to slide forward. At the same time, the first cam slider 210 pressed by the protrusion pin 222 starts to slide forward. Further, when the assist slider 220 starts to slide, the roller pins 16b, 16b relatively move the cam groove 223 and the linear groove 224 rightward.

In addition, when the first slider 160 starts to slide, the second slider 150 linked by the link lever 54 starts to slide rightward. As a result, as shown in FIG. 7A and 7B, the cam pins 15b, 15b move from the first horizontal portion 151a of the cam groove 151 of the second slider 150 to the first incline portion 151b, and then moves to the second horizontal portion 151c and the second incline portion 151d. Consequently, the second slider 150 moves upward and, in synchronization with this, the pickup unit 56 moves upward.

FIGS. 30A to 30C are cam charts in relation to the cam groove 151 of the second slider 150, the cam groove 182 of the second cam slider 180, and the cam groove 211 of the first cam slider 210.

A cam chart (FIG. 30A) in relation to the cam groove 151 of the second slider 150 represents an upward/downward movement of the pickup unit 56. A cam chart (FIG. 30B) in relation to the cam groove 182 of the second cam slider 180 represents an upward/downward movement of the left side portion of the motor unit 59, which is relative to the pickup unit 56, that is, with the pickup unit 56 as a static system. A cam chart (FIG. 30C) in relation to the cam groove 211 of the first cam slider 210 also represents an upward/downward movement of the right side portion of the motor unit 59 with the pickup unit 56 as a static system. In FIGS. 30A to 30C, at a point representing 0 and in a left side thereof on an abscissa axis (X axis), the second cam slider 150, the second cam slider 180, and the first cam slider 210 are in the initial states.

As described above, the first cam slider 210 starts to slide, to thereby cause the cam pin 66b of the motor unit 59 engaged with the cam groove 211 to move from the first horizontal portion 211a to the first incline portion 211b, the second horizontal portion 211c, and the second incline portion 211d, in succession. As shown in FIGS. 11, 30B, and 30C, the cam pin 66b of the motor unit 59 temporarily moves downward with respect to the pickup unit 56, and then moves upward. The downward movement of the motor unit 59 serves a purpose when the disk 100 is ejected. This will be described in the following.

Figure 20:
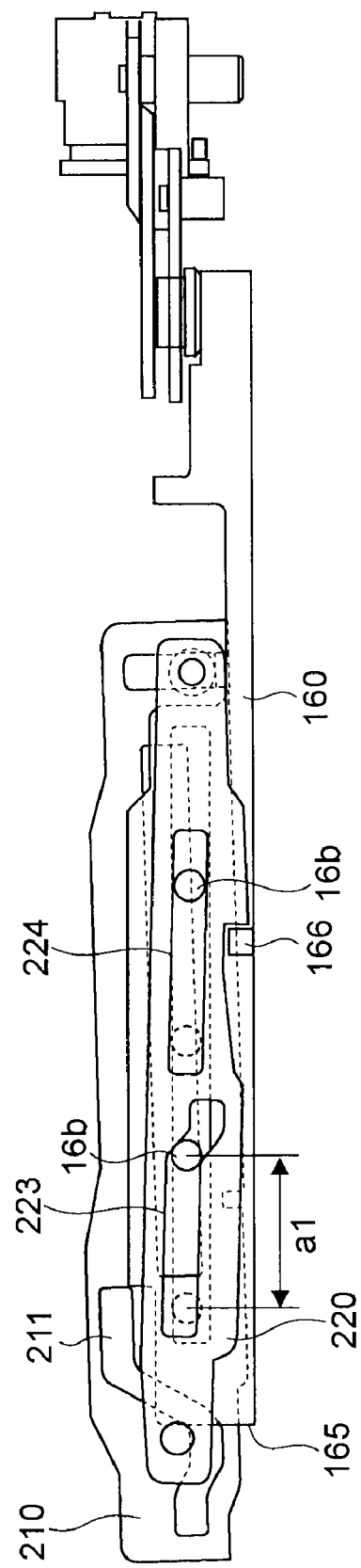
FIG. 20 is a view corresponding to FIG. 18 in a case where the first slider or the like is slid a predetermined distance from the initial position.
Figure 21A:
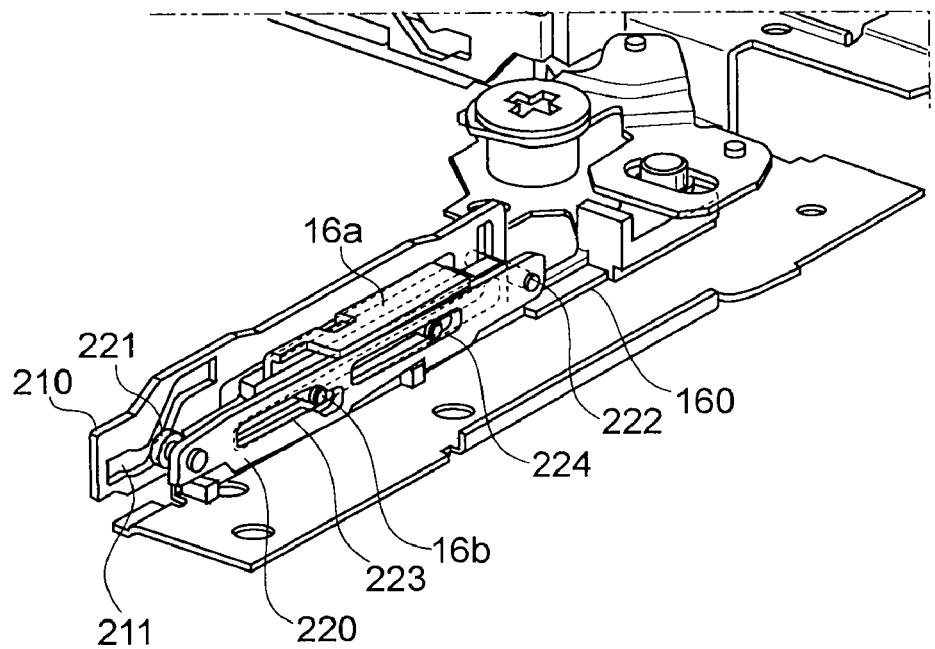
FIGS. 21A and 21B are views corresponding to FIGS. 19A and 19B, respectively, at a timing as shown in FIG. 20.
Figure 21B:
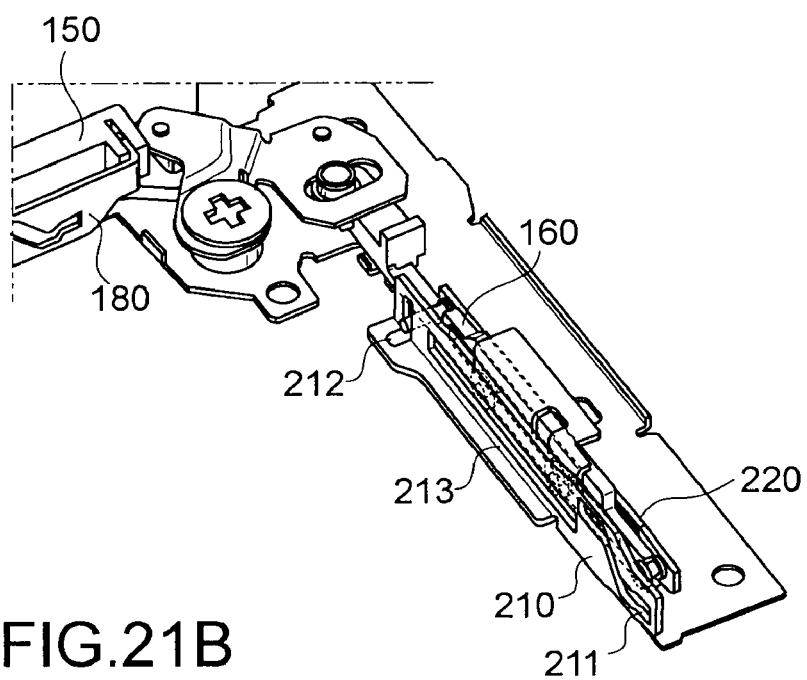

As shown in FIG. 20, when the first slider 160 in conjunction with the movement of the main slider 20 slides, for example, a distance a1 from the initial position of the first slider, the roller pin 16b moves to the incline portion 223a of the cam groove 223 of the assist slider 220. As a result, the front end portion of the assist slider 220 starts to move upward with the roller pin 16b as a shaft. FIGS. 21A and 21B show perspective views at a timing shown in FIG. 20.

Meanwhile, as shown in FIGS. 30A to 30C, at a time when the first slider 160 reaches the distance a1 after starting to slide, the first cam slider 210 and the second cam slider 180 cause the motor unit 59 to reach an uppermost position with respect to the pickup unit 56. It should be noted that the cam grooves 211 and 182 are formed so that the right side portion of the motor unit 59 reaches the uppermost position faster than the left side portion thereof.

It should be noted that the distance a1 is 4 to 6 mm, typically, 5 mm, but is not limited to this range.

Figure 24:
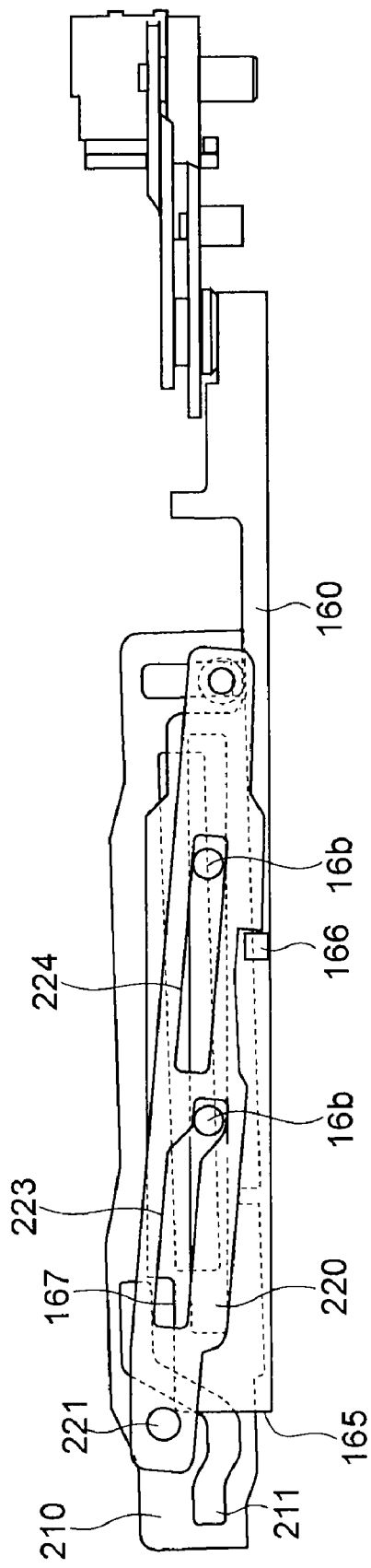
FIG. 24 is a view corresponding to FIG. 18 at a timing as shown in FIGS. 22 and 23A to 23D.

In conjunction with the slide of the main slider 20, the first slider 160 further slides more than the distance a1 to reach a distance a2 from the start of the slide. As a result, as shown in FIG. 24, the front end portion of the assist slider 220 further moves upward, which releases the engagement between the roller 221 and the front end surface 165 of the first slider 160. Accordingly, the roller 221 moves on the step portion 167 of the first slider 160, so the forward movement of the moving member 200 is stopped at a time when the first slider 160 reaches the distance a2.

Figure 22:
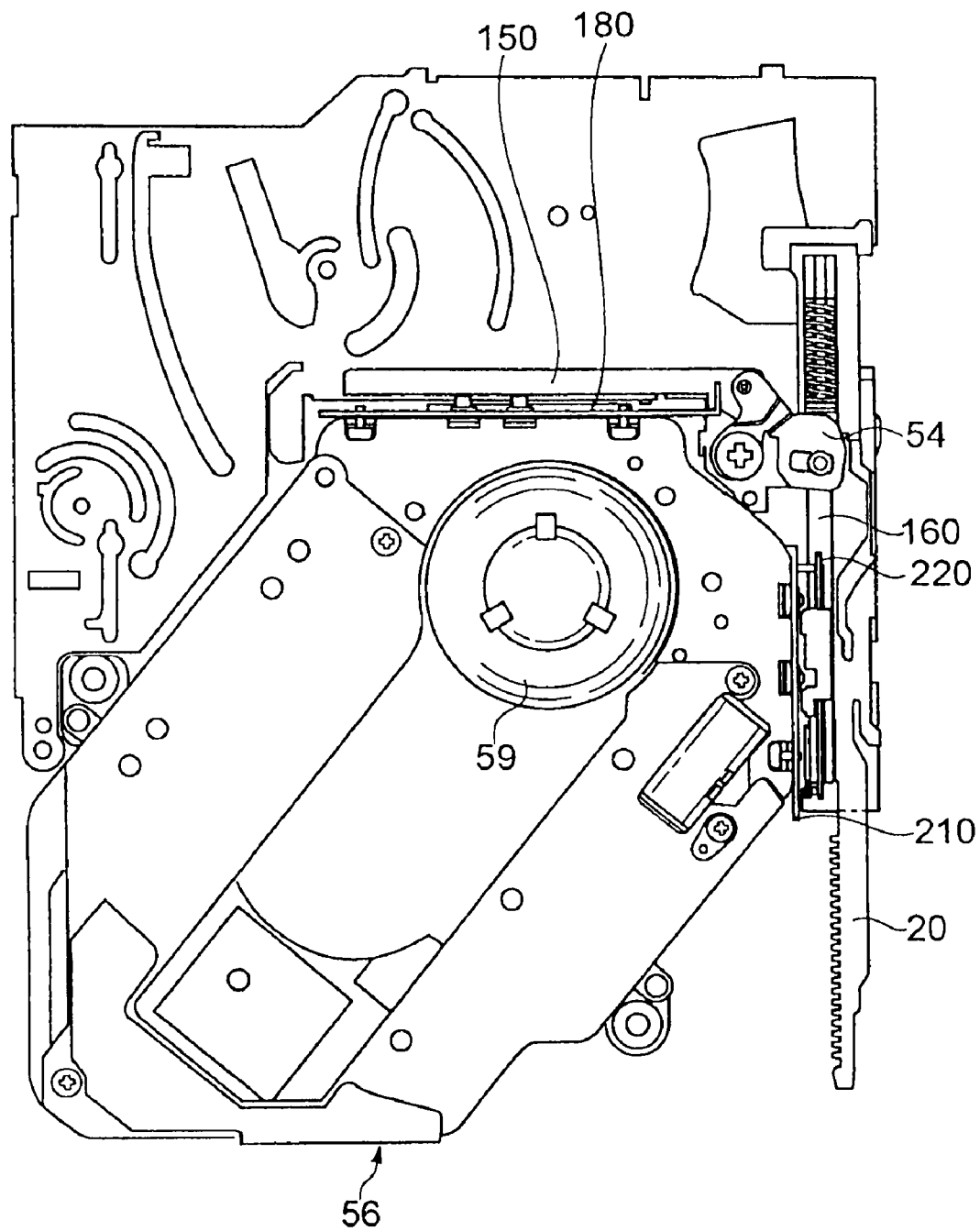
FIG. 22 is a view corresponding to FIG. 16 when a slide distance of the first slider is a2.
Figure 23A:
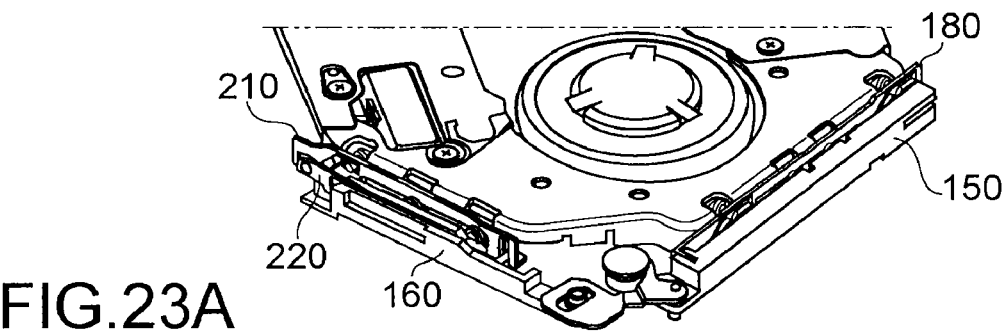
FIGS. 23A to 23D are views corresponding to FIGS. 17A to 17D, respectively, when the slide distance of the first slider is a2.
Figure 23B:
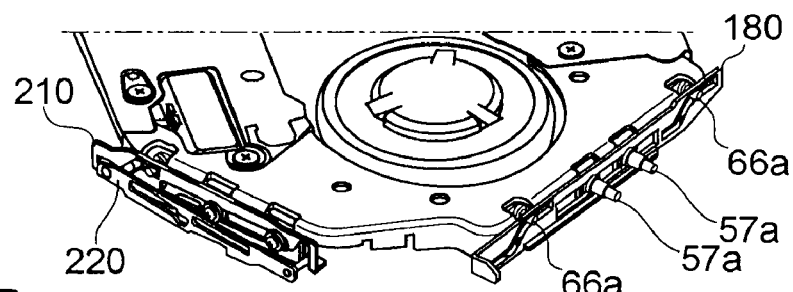
Figure 23C:
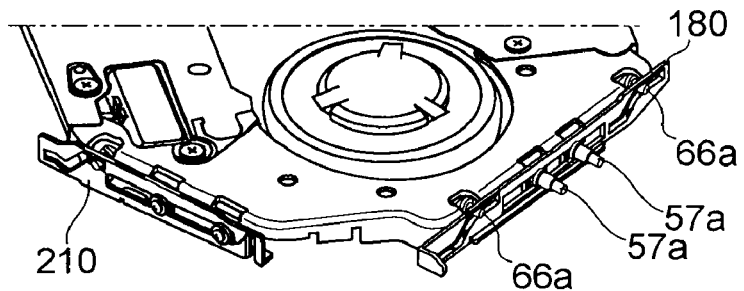
Figure 23D:
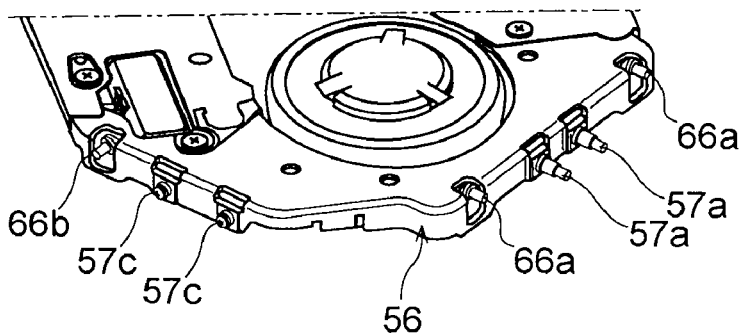
Figure 25A:
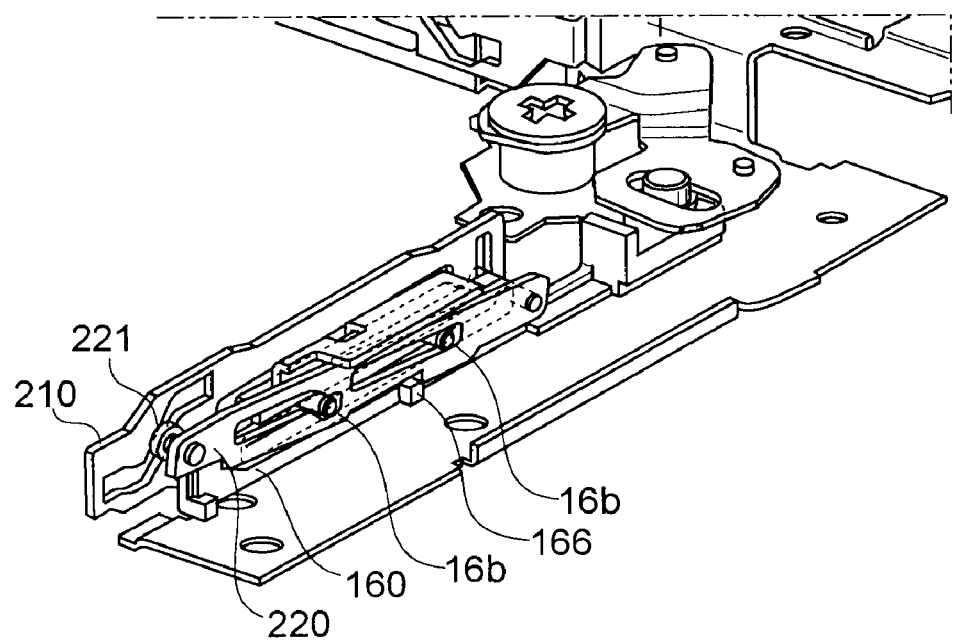
FIGS. 25A and 25B are views corresponding to FIGS. 19A and 19B, respectively, when the slide distance of the first slider is a2.
Figure 25B:
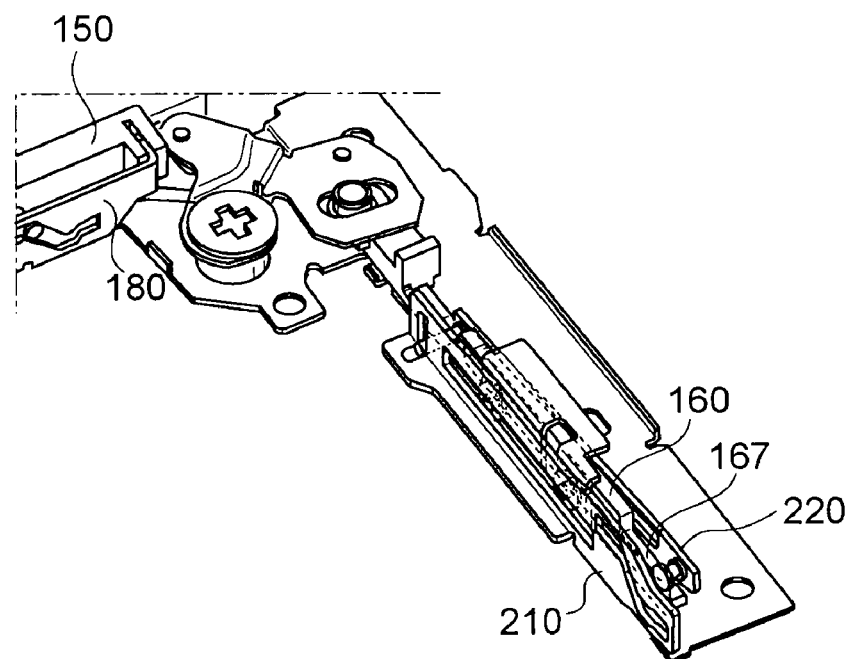

FIG. 22 is a view corresponding to FIG. 16, which shows a case where the first slider 160 slides the distance a2. FIGS. 23A to 23D are views corresponding to FIGS. 17A to 17D, respectively, which shows the case where the first slider 160 slides the distance a2. FIGS. 25A and 25B are views corresponding to FIGS. 19A and 19B, respectively, which shows the case where the first slider 160 slides the distance a2.

It should be noted that the distance a2 is 5 to 7 mm, typically, 6 mm, but is not limited to this range.

Even when the engagement between the roller 221 and the first slider 160 is released at a time when the slide distance reaches the distance a2, the main slider 20 continues to slide. Therefore, along with this, the first slider 160 continues to slide, and thus the second slider 150 also continues to slide rightward.

However, at a time when the forward slide of the moving member 200 is stopped, the cam pin 66b already reaches the third horizontal portion 211e of the first cam slider 210. That is, as shown in FIGS. 30B and 30C, at the time when the forward slide of the moving member 200 is stopped, the motor unit 59 already stops with respect to the pickup unit 56. Therefore, from the time when the slide distance reaches the distance a1, the pickup unit 56 and the motor unit 59 integrally move upward.

In this way, the assist slider 220 is engaged with the roller pins 16b, 16b so that the roller 221 deviates upward from the first slider 160. Thus, the assist slider 220 can be formed into a plate shape. That is, the assist slider 220 can be made thin, with the result that a footprint of the assist slider 220 in the case 6 can be reduced in size.

When the first slider 160 reaches nearly the distance a2, the cam pins 15b, 15b reach the third horizontal portion 151e as shown in FIG. 7A. Accordingly, at this time, the pickup unit 56 reaches the uppermost portion, and the center ring protrusion portion 62a of the disk table 62 is inserted into a center hole of the disk 100. Then, the center ring protrusion portion 62a is inserted into the opening 8a of the upper shell 8, and the disk 100 is pressed against the lower surface of the upper shell 8. That is, a clamping force for chucking the disk 100 is generated, to thereby fit the center ring protrusion portion 62a to the center hole of the disk 100, and mount the disk 100 on the disk table 62.

In the embodiment of the present invention, by providing the third horizontal portion 151e to the cam groove 151 of the second slider 150, the pickup unit 56 can be brought into the uppermost position for a predetermined time period continuously. As a result, the clamping force can be maintained for the predetermined time period, and thus the disk 100 can be reliably chucked. The predetermined time period typically refers to a time period during which the second slider 150 slides 0.5 mm (to 2 mm), but is not limited to this range, and can be suitably changed.

Figure 28:
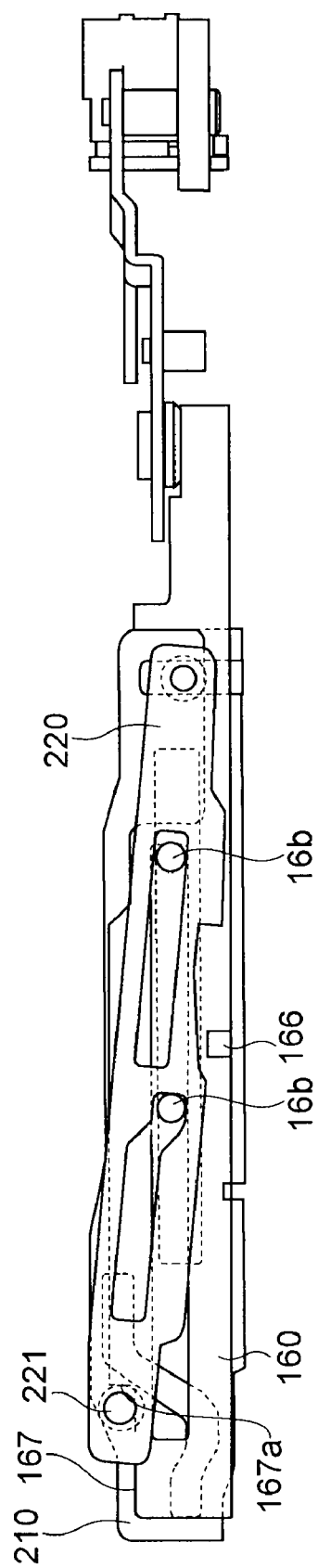
FIG. 28 is a view corresponding to FIG. 18 at a timing as shown in FIGS. 26 and 27A to 27D.

When the first slider 160 and the second slider 150 slide more than the distance a2 and reach a distance a3 from the start of the slide in conjunction with the slide of the main slider 20, the slide of the main slider 20 stops. As a result, the slides of the first slider 160 and the second slider 150 also stop. At this time, as shown in FIG. 28, the roller 221 is brought into contact with a wall portion 167a of the step portion 167 of the first slider 160, which may stop the slide of the first slider 160.

Figure 26:
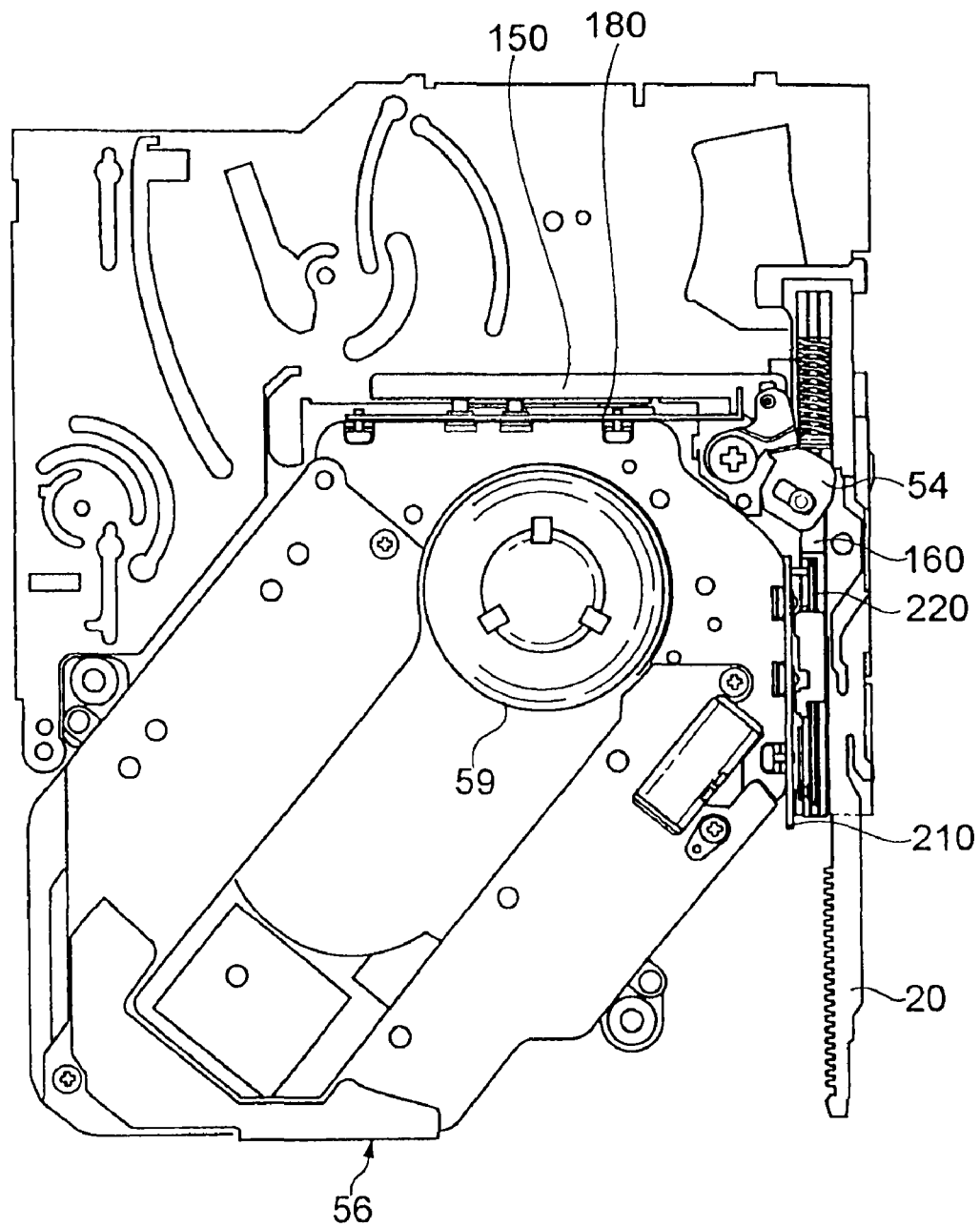
FIG. 26 is a view corresponding to FIG. 16, when the slide distance of the first slider is a3 (last position)
Figure 27A:
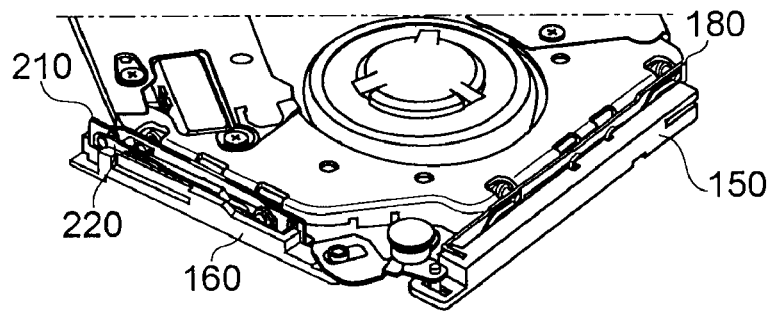
FIGS. 27A to 27D are views corresponding to FIGS. 17A to 17D, respectively, when the slide distance of the first slider is a3 (last position)
Figure 27B:
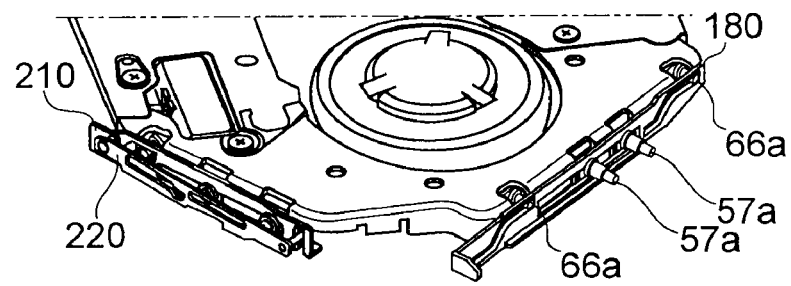
Figure 27C:
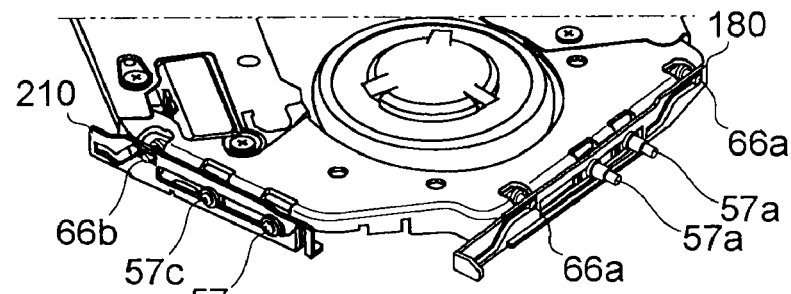
Figure 27D:
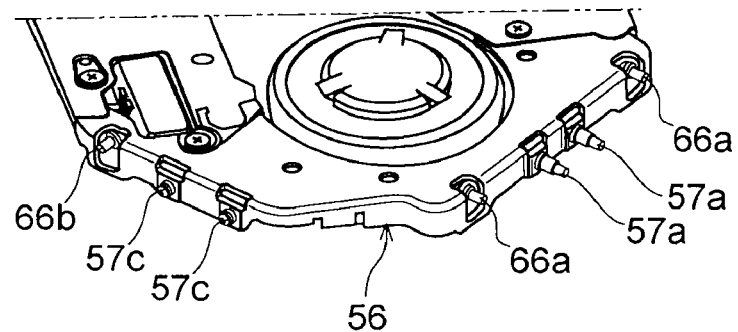
Figure 29A:
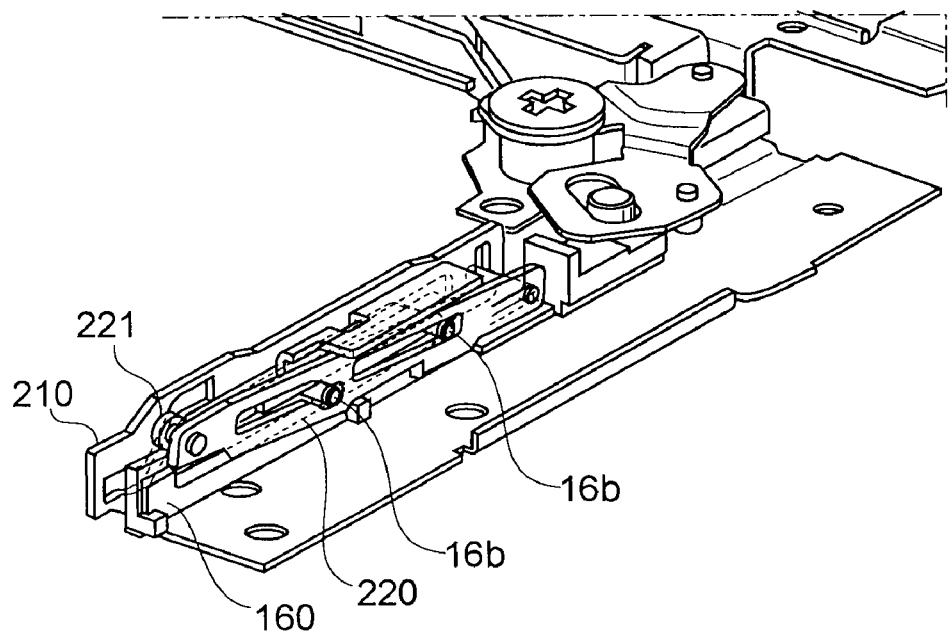
FIGS. 29A and 29B are views corresponding to FIGS. 19A and 19B, respectively, when the slide distance of the first slider is a3.
Figure 29B:
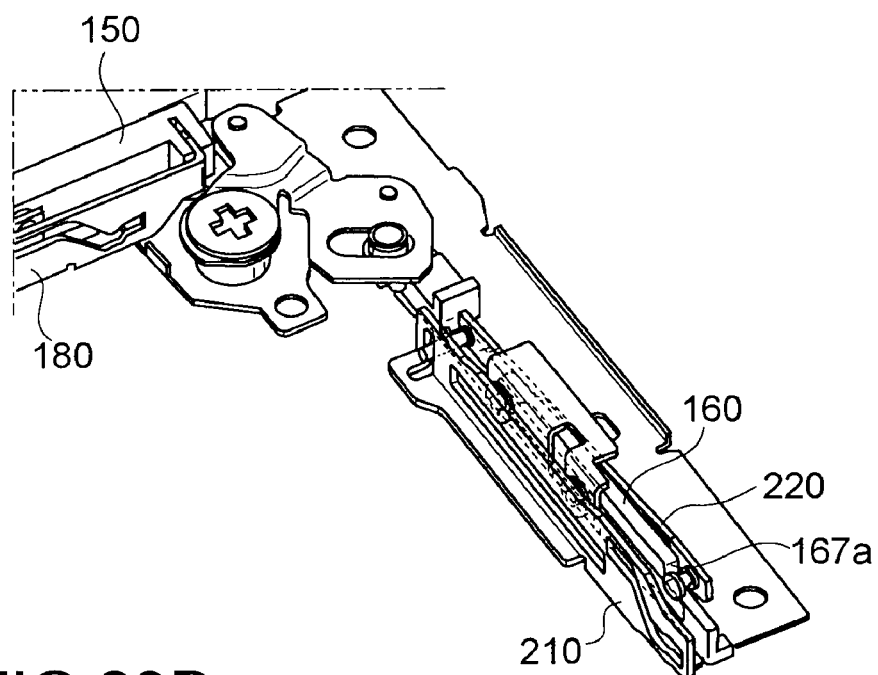

FIG. 26 is a view corresponding to FIG. 16, which shows a case where the first slider 160 slides the distance a3. FIGS. 27A to 27D are views respectively corresponding to FIGS. 17A to 17D, each of which shows the case where the first slider 160 slides the distance a3. FIGS. 29A and 29B are views respectively corresponding to FIGS. 19A and 19B, each of which shows the case where the first slider 160 slides the distance a3.

It should be noted that the distance a3 is 9 to 11 mm, typically, 10 mm, but is not limited to this range. The distance a2 (or may be distance a1) that the moving member 200 slides is set to a distance (a second distance) shorter than the total distance a3 (a first distance) that the first slider 160 slides.

During the slide between the distances a2 and a3, the cam pins 15b, 15b move on the third incline portion 151f of the cam groove 151 of the second slider 150, to thereby move the pickup unit 56 downward from the uppermost position. When the cam pins 15b, 15b reach the fourth horizontal portion 151g, the pickup unit 56 leads to a nearly horizontal state. After that, the pickup unit 56 and the motor unit 59 are driven to record the information signal on the disk 100, or reproduce the information signal recorded on the disk 100.

As described above, the pickup unit 56 supports the motor unit 59 through the moving member 200. Therefore, when the pickup unit 56 moves upward and downward with the second slider 150, in conjunction with this, the motor unit 59 moves upward and downward. In addition, the moving member 200 causes the motor unit 59 to move relatively to the pickup unit 56. That is, when the pickup unit 56 moves downward, the motor unit 59 moves downward in conjunction with the pickup unit 56. Therefore, even when the upward/downward movement distance of the pickup unit 56 is set to be short, a clearance for loading the disk 100 into the case 6 can be secured, with the result that interference between the disk 100 and the motor unit 59 can be prevented.

Further, a moving speed (slide speed) of the second slider 150 linking to the first slider 160 is the same as that of the first slider 160. In other words, the first slider 160 and the second slider 150 move in the same way (at a ratio of 1:1), which facilitates designing of timings of the upward/downward movement of the motor unit 59 with the moving member 200 that moves integrally with the first slider 160 halfway and the upward/downward movement of the pickup unit 56 with the second slider 150.

After the information signal is recorded on the disk 100 or reproduced from the disk 100, in a case where the disk 100 is to be ejected, the disk drive apparatus 5 performs an operation opposite to the operation described above.

The drive motor 19 rotates reversely to a case of loading the disk 100. When this reverse rotation of the drive motor 19 causes the main slider 20 to start to move backward, the protrusion portion 54d of the link lever 54 is engaged with the operation groove 20e of the main slider 20. With this structure, the link lever starts to return, the first slider 160 slides backward, and the second slider 150 slides leftward. Thus, as shown in FIGS. 30A to 30C, the pickup unit 56 and the motor unit 59 operate at the distances a3, a2, a1, and 0 in this order.

When the first slider 160 slides substantially between the distances a2 and 0, the pickup unit 56 and the motor unit 59 move downward. During this slide, the motor unit 59 moves downward relative to the pickup unit 56 in a state where the lower surface of the disk 100 mounted on the disk table 62 and the upper surface of the pickup unit 56 are in contact with each other. As a result, the disk 100 is dechucked from the center ring protrusion portion 62a of the disk table 62. When the disk 100 is to be dechucked, a peripheral portion of the disk 100 is held by the arm members or the like.

In the case of loading the disk 100, the moving member 200 slides because the roller 221 is pressed by the first slider 160. In the case of ejecting, as shown in FIGS. 25A, etc., the moving member 200 is engaged with the projection portion 166 provided to the first slider 160 to slide to the initial position thereof.

In the dechucking operation described above, when the first slider 160 slides between the distances a1 to 0, the pickup unit 56 temporarily stops moving downward due to the second horizontal portion 151c (see, FIG. 7) of the second slider 150. At this time, the motor unit 59 moves downward to the lowermost position relative to the pickup unit 56 due to the second horizontal portion 211c of the first cam slider 210 and a portion of the cam groove 182 of the second cam slider 180, which has substantially the same shape as the second horizontal portion 211c. In other words, at this time, a relative vertical interval between the pickup unit 56 and the motor unit 59 is increased to a maximum extent.

Specifically, at the time of loading the disk 100, between when the moving member 200 starts to slide and reaches the distance a2, the second horizontal portion 211c of the first cam slider 210 causes the motor unit 59 to move downward against the upward movement of the pickup unit 56. Consequently, as described above, the relative vertical interval between the pickup unit 56 and the motor unit 59 can be increased to the maximum extent.

As a result, at the time of ejecting the disk 100, a dechucking force for the disk 100 can be increased, to thereby reliably dechuck the disk 100. As described above, the relative vertical interval between the pickup unit 56 and the motor unit 59 is increased to the maximum extent between the distances a2 and 0, with the result that the member that constitutes the motor unit 59 can be prevented from protruding downward from the opening portion 7a of the lower shell 7 while the dechucking force is increased. That is, the dechucking of the disk 100 can be reliably performed, while realizing reduction in thickness of the disk drive apparatus 5.

There are variations in the disk 100, and examples thereof include ones which are thick and thin. For reliable dechucking, the vertical interval should be made larger as the thickness of the disk is increased. Also, the examples of the disk 100 include ones which have high and low rigidity. In a case where the disk has low rigidity, a deflection amount of the disk from the start of the dechucking to the end thereof becomes large, so the vertical interval should be made large.

From the viewpoints described above, the second horizontal portion 151c may not necessarily be horizontal. Alternatively, the second horizontal portion 211c of the first cam slider 210 (the portion of the cam groove 182 of the second cam slider 180, which has substantially the same shape as the second horizontal portion 211c) may not necessarily be horizontal.

However, thanks to the second horizontal portion 211c, the motor unit 59 can be located at the lowermost position for a predetermined time period continuously. As a result, the maximum dechucking force of the disk 100 can be maintained for the predetermined time period, which can reliably detach the disk 100 from the disk table 62. The predetermined time period depends on the length of the second horizontal portion 211c and the slide speed of the first cam slider 210, and only has to be set to an appropriate value.

Next, a description will be made on a merit in the case where the moving speed (slide speed) of the second slider 150 linking to the first slider 160 is the same as that of the first slider 160 as described above.

For example, in a disk apparatus disclosed in Japanese Patent Application Laid-open No. 2006-344340, a slider that slides in a longitudinal direction by the drive of a loading motor is provided. The slider is linked to a sub-slider through a cam lever. The sub-slider is disposed between a traverse base and a rear base in a direction perpendicular to the slider).

The cam lever includes a rotation support point, a first pin, and a second pin. The second pin is engaged with a cam groove formed on an upper surface of the slider, and a third pin is engaged with a cam groove formed on an upper surface of the sub-slider. The cam lever is caused to operate by the movement of the slider, and causes a traverse cam member to operate by moving the sub-slider, thereby displacing the traverse base.

In addition, the slider moves, thereby rotating the cam lever around the rotation support point by a predetermined angle. The rotation of the cam lever causes the sub-slider to move, and thus a first spindle cam member that is engaged with the sub-slider (the traverse cam member also moves. Meanwhile, a spindle lever has an arc-shaped groove along which the second pin of the cam lever slides. With this structure, the rotation of the cam lever along with the movement of the slider causes the second spindle cam member to move in the same direction as the slider. The spindle lever is disposed to cover the slider. The slider and the spindle lever are relatively movable.

That is, the movement of the slider causes the first spindle member and the second spindle cam member to move, which moves upward and downward a clutch plate that is engaged with the first spindle member and the second spindle cam member, and supports a spindle motor. That is, as described above, the spindle motor moves separately from the transverse base (moves upward and downward).

With reference to FIG. 31, a description will be given on movements of the slider 340, the cam lever 370, and the spindle lever 342. As illustrated in FIGS. 31A-31C, the spindle lever 342 has a linear groove 342a that is longitudinally parallel to the traverse cam member (not shown in FIGS. 31A-31C. Continuously with the linear groove 342a, the arc-shaped groove 342b is formed (see, FIG. 11 of Japanese Patent Application Laid-open No. 2006-344340). When the slider 340 moves in a +Y direction by the loading motor, the cam lever 370 rotates as described above. The rotation of the cam lever 370 causes the second pin 372 to press a linear portion of the groove, with the result that the spindle lever 342 moves in the +Y direction.

When the slider 340 continues to move in the +Y direction and the cam lever 370 continues to rotate, the second pin 372 enters an end portion of the arc portion of the groove. Thereafter, the spindle lever 342 remains still. Even when the cam lever 370 continues to rotate, the spindle lever 342 remains still. Accordingly, after that, the second spindle cam member connected to the spindle lever 342 does not move, but the spindle motor moves upward in conjunction with the upward movement of the traverse base. That is, a relative movement between the spindle motor and the traverse base is eliminated.

However, the groove of the spindle lever 342 is constituted of the linear groove 342a and the arc groove 342b, so the moving speeds of the slider 340 and the sub-slider that are connected to the spindle lever 342 are not the same ($\neq$1:1). In this case, it becomes difficult to design timings of the upward/downward movements of the traverse base and the spindle motor, resulting in decreasing reliability of the product.

It should be noted that, as shown in FIG. 8, in the disk drive apparatus 5 according to this embodiment, the front end portion of the first cam slider 210 protrudes forward of a tapered portion 57d of the pickup base 57 at the final position (left-hand portion of FIG. 8). This is because the cam pin 66b is required to be located at the position shown in FIG. 8. The more specific reason is as follows.

Figure 32:
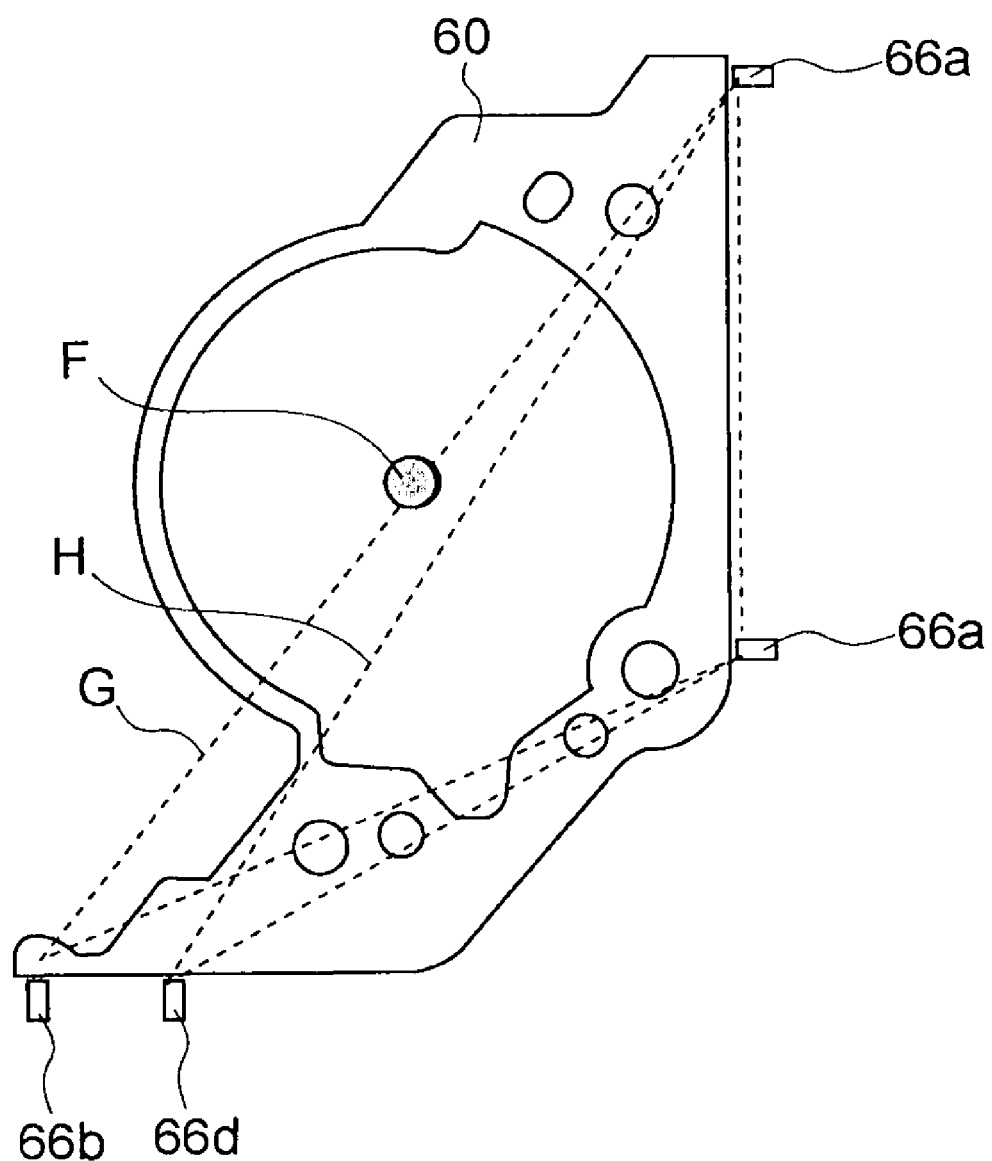
FIG. 32 is a plan view showing a base of the motor unit.

FIG. 32 is a plan view showing the base 60 of the motor unit 59. To the base 60 of the motor unit 59, the cam pins 66a, 66a, 66b are provided as described above. The cam pins 66a, 66a are engaged with the second cam slider 180, and the cam pin 66b is engaged with the first cam slider 210, with the result that the motor unit 59 is supported by the pickup unit 56.

To prevent the front end portion of the first cam slider 210 from protruding forward of the tapered portion 57d of the pickup base 57, the cam pin 66b should be located at a more backward position, e.g., at a position denoted by reference numeral 66d (see, FIG. 32) because of the shape of the cam groove 211. With this structure, a shaft center F of the spindle motor is located outside a triangle H formed by three points of the cam pins 66a, 66a and a cam pin 66d, which raises the following problem.

When the motor unit 59 moves upward and the disk 100 is mounted on the disk table 62, a downward force is applied to the motor unit 59. Therefore, in the case where the shaft center F is located outside the triangle H, the front side of the motor unit 59 inclines downward when the disk 100 is chucked. That is, the motor unit 59 gets out of balance when chucking the disk 100, which causes such a problem that the disk 100 is not reliably mounted on the disk table 62.

Accordingly, to prevent such a problem, the cam pin 66d is located so that the shaft center F is positioned on a base of a triangle G.

It should be understood by those skilled in the art that various modifications, combinations, sub-combinations and alterations may occur depending on design requirements and other factors insofar as they are within the scope of the appended claims or the equivalents thereof.

What is claimed is:

1. A recording medium drive apparatus configured to drive a recording medium, comprising:
a case;
a drive source used for loading the recording medium into the case and ejecting the recording medium from the case;
a motor unit configured to hold the recording medium and rotate the recording medium held;
a pickup unit configured to perform one of recording a signal on the recording medium that is rotated by the motor unit and reproducing the signal recorded on the recording medium;
a first slider that is driven by the drive source to slide a first distance in a first direction;
a second slider that is cam-engaged with the pickup unit and slides in a second direction to move the pickup unit upward and downward;
a moving member that is releasably engaged with the first slider, engaged with the pickup unit, and cam-engaged with the motor unit, and slides a second distance in the first direction integrally with the first slider while being engaged with the first slider, to move the motor unit upward and downward, the second distance being shorter than the first distance; and
a link mechanism configured to link the first slider and the second slider so that a moving speed of the first slider in the first direction corresponds to a moving speed of the second slider in the second direction and the second slider slides the first distance.

2. The recording medium drive apparatus according to claim 1, wherein the moving member includes an assist slider configured to slide in the first direction by being pressed by the first slider, and a cam slider that is cam-engaged with the motor unit and configured to slide in the first direction integrally with the assist slider by being pressed by the assist slider.

3. The recording medium drive apparatus according to claim 2, wherein the assist slider includes a roller that is pressed by the first slider when the pickup unit is moved upward, and cam-engaged with the first slider so that the roller is released from pressure by the first slider after the assist slider slides the second distance.

4. The recording medium drive apparatus according to claim 1, wherein the moving member is cam-engaged with the motor unit so that the motor unit is moved downward against an upward movement of the pickup unit between when the moving member starts to slide and when the moving member reach the second distance.

5. The recording medium drive apparatus according to claim 1, wherein the second slider is cam-engaged with the pickup unit so that a state where the pickup unit is located at an uppermost position is maintained for a predetermined time period.

6. An electronic apparatus capable of driving a recording medium, comprising:
a recording medium drive apparatus including
a case,
a drive source used for loading the recording medium into the case and ejecting the recording medium from the case,
a motor unit configured to hold the recording medium and rotate the recording medium held,
a pickup unit configured to perform one of recording a signal on the recording medium that is rotated by the motor unit and reproducing the signal recorded on the recording medium,
a first slider that is driven by the drive source to slide a first distance in a first direction, a second slider that is cam-engaged with the pickup unit and slides in a second direction to move the pickup unit upward and downward, a moving member that is releasably engaged with the first slider, engaged with the pickup unit, and cam-engaged with the motor unit, and slides a second distance in the first direction integrally with the first slider while being engaged with the first slider, to move the motor unit upward and downward, the second distance being shorter than the first distance, and a link mechanism configured to link the first slider and the second slider so that a moving speed of the first slider in the first direction corresponds to a moving speed of the second slider in the second direction and the second slider slides the first distance; and a main body on which the recording medium drive apparatus is mounted.

* * * * *